US012051199B2

(12) United States Patent
Luo et al.

(10) Patent No.: US 12,051,199 B2
(45) Date of Patent: Jul. 30, 2024

(54) IMAGE PROCESSING METHOD AND APPARATUS, SERVER, MEDICAL IMAGE PROCESSING DEVICE AND STORAGE MEDIUM

(71) Applicant: Tencent Technology (Shenzhen) Company Limited, Shenzhen (CN)

(72) Inventors: Lishu Luo, Shenzhen (CN); Hong Shang, Shenzhen (CN); Zhongqian Sun, Shenzhen (CN); Han Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 17/515,174

(22) Filed: Oct. 29, 2021

(65) Prior Publication Data
US 2022/0051405 A1    Feb. 17, 2022

Related U.S. Application Data

(63) Continuation of application No. PCT/CN2020/115768, filed on Sep. 17, 2020.

(30) Foreign Application Priority Data

Nov. 12, 2019  (CN) .......................... 201911103557.7

(51) Int. Cl.
    *G06K 9/00*       (2022.01)
    *G06F 18/214*     (2023.01)
    (Continued)

(52) U.S. Cl.
    CPC .......... *G06T 7/0012* (2013.01); *G06F 18/214* (2023.01); *G06N 3/04* (2013.01);
    (Continued)

(58) Field of Classification Search
    CPC ......... G06T 7/0012; G06T 2207/10068; G06T 2207/30096; G06T 2207/20016;
    (Continued)

(56) References Cited

U.S. PATENT DOCUMENTS 6,310,967 B1 * 10/2001 Heine .................. G06T 7/0012
                                                382/128
9,779,495 B2 * 10/2017 Shibuya ................ G06T 11/206
(Continued)

FOREIGN PATENT DOCUMENTS

CN      108009515 A      5/2018
CN      108601509 A      9/2018
(Continued)

OTHER PUBLICATIONS

Tencent Technology, WO, PCT/CN2020/115768, Dec. 23, 2020, 5 pgs.
(Continued)

*Primary Examiner* — Shervin K Nakhjavan
(74) *Attorney, Agent, or Firm* — Morgan, Lewis & Bockius LLP

(57) ABSTRACT

Embodiments of this application disclose an image processing method performed by a computer device, and a computer-readable storage medium. The method includes: obtaining a to-be-detected image, and performing down-sampling abnormality classification processing on the to-be-detected image, to obtain a predicted abnormality category label and a target feature image; performing preliminary abnormality positioning processing based on the predicted abnormality category label and the target feature image, to obtain an initial positioning image corresponding to the to-be-detected image; performing up-sampling abnormality positioning processing on the initial positioning image, to obtain a target positioning image corresponding to the
(Continued)

to-be-detected image; and outputting the predicted abnormality category label and the target positioning image, the initial positioning image and the target positioning image being configured for reflecting attribute information of a target region associated with the predicted abnormality category label within the to-be-detected image.

17 Claims, 14 Drawing Sheets

(51) Int. Cl.
   *G06N 3/04* (2023.01)
   *G06T 7/00* (2017.01)
   *G06V 10/25* (2022.01)

(52) U.S. Cl.
   CPC .... *G06V 10/25* (2022.01); *G06T 2207/10068* (2013.01); *G06T 2207/30096* (2013.01)

(58) Field of Classification Search
   CPC . G06T 2207/20076; G06T 2207/30092; G06T 2207/20081; G06T 2207/20084; G06F 18/214; G06N 3/04; G06N 3/045; G06N 3/048; G06N 3/08; G06V 10/25; G06V 10/82
   See application file for complete search history.

(56) References Cited

U.S. PATENT DOCUMENTS

| | | | |
|---|---|---|---|
| 10,420,535 B1* | 9/2019 | Huang | A61B 8/5207 |
| 11,145,056 B2* | 10/2021 | Chan | A61B 5/015 |
| 11,735,316 B2* | 8/2023 | Shi | G06N 3/04 |
| | | | 382/128 |
| 2013/0216118 A1 | 8/2013 | Rogan et al. | |
| 2017/0213112 A1* | 7/2017 | Sachs | G06N 3/045 |
| 2017/0231550 A1* | 8/2017 | Do | G06T 7/0012 |
| | | | 382/128 |
| 2019/0180153 A1 | 6/2019 | Buckler et al. | |
| 2019/0188848 A1* | 6/2019 | Madani | G16H 30/40 |
| 2020/0058126 A1* | 2/2020 | Wang | G06F 18/213 |
| 2020/0066407 A1* | 2/2020 | Stumpe | G06N 3/045 |
| 2020/0085382 A1* | 3/2020 | Taerum | G06T 7/0016 |
| 2020/0111210 A1* | 4/2020 | Maximo | G06V 10/764 |
| 2020/0160983 A1* | 5/2020 | Lyman | G06F 18/214 |
| 2021/0241027 A1* | 8/2021 | Hu | G06V 30/2504 |
| 2021/0374962 A1* | 12/2021 | Khojasteh | G16H 30/40 |
| 2022/0005584 A1* | 1/2022 | Takahashi | G06V 30/194 |
| 2022/0343178 A1* | 10/2022 | Hall | G06N 3/08 |

FOREIGN PATENT DOCUMENTS

| | | | | |
|---|---|---|---|---|
| CN | 108665457 A | 10/2018 | | |
| CN | 108776787 A | 11/2018 | | |
| CN | 109410194 A | 3/2019 | | |
| CN | 109447960 A | 3/2019 | | |
| CN | 109493317 A | 3/2019 | | |
| CN | 109493954 A | * | 3/2019 | ........... G06K 9/0061 |
| CN | 109522807 A | 3/2019 | | |
| CN | 110136106 A | 8/2019 | | |
| CN | 110298831 A | 10/2019 | | |
| CN | 110363138 A | 10/2019 | | |
| CN | 110866908 A | 3/2020 | | |
| CN | 109961019 B | * | 3/2021 | ......... G06K 9/00718 |
| KR | 20180064863 A | 6/2018 | | |

OTHER PUBLICATIONS

Tencent Technology, IPRP, PCT/CN2020/115768, May 17, 2022, 6 pgs.
Extended European Search Report, EP20886491.8, Aug. 10, 2022, 9 pgs.
Jun-Yan He et al., "Hookworm Detection in Wireless Capsule Endoscopy Images with Deep Learning", IEEE Transactions on Image Processing, IEEE, vol. 27, No. 5, May 1, 2018, XP11678329, 14 pgs.
Teppei Kanayama et al., "Gastric Cancer Detection from Endoscopic Images Using Synthesis by GAN", Oct. 10, 2019, arxiv.org, Olin Library, Cornell University, XP47522973, 9 pgs.
Hong Shang et al., "What and How Other Datasets Can Be Leveraged for Medical Imaging Classification", 2019 IEEE 16th International Symposium on Biomedical Imaging (ISBI 2019), Jul. 11, 2019, Retrieved from the Internet: https://ieeexplore.ieee.org/document/8759148.
Matko Šarić et al., "CNN-based Method for Lung Cancer Detection in Whole Slide Histopathology Images", 2019 4th International Conference on Smart and Sustainable Technologies (SpliTech), Aug. 1, 2019, 4 pgs.
Tan Guanghong et al., "Low Parameter Real-Time Image Segmentation Algorithm Based on Convolutional Neural Network", Progress in Laser and Optoelectronics, Jul. 5, 2019, Retrieved from the Internet: https://www-opticsjournal-net.translate.goog/Articles/Abstract/lop/56/9/091003.cshtml?_x_tr_sl=zh-CN&_x_tr_tl=en&_x_tr_hl=en&_x_tr_pto=nui,sc&_x_tr_sch=http.
Tencent Technology, ISR, PCT/CN2020/115768, Dec. 23, 2020, 3 pgs.
Qi Wang et al., "Embedding Structured Contour and Location Prior in Siamesed Fully Convolutional Networks for Road Detection", Jul. 27, 2017, Retrieved from the Internet: https://arxiv.org/abs/1905.01575#.

* cited by examiner

IMAGE PROCESSING METHOD AND APPARATUS, SERVER, MEDICAL IMAGE PROCESSING DEVICE AND STORAGE MEDIUM

CROSS-REFERENCE TO RELATED APPLICATIONS

This application is a continuation application of PCT Patent Application No. PCT/CN2020/115768, entitled "IMAGE PROCESSING METHOD AND APPARATUS, SERVER, MEDICAL IMAGE PROCESSING DEVICE AND STORAGE MEDIUM" filed on Sep. 17, 2020, which claims priority to Chinese Patent Application No. 201911103557.7, filed with the State Intellectual Property Office of the People's Republic of China on Nov. 12, 2019, and entitled "IMAGE PROCESSING METHOD AND APPARATUS, SERVER, AND STORAGE MEDIUM", all of which are incorporated herein by reference in their entirety.

FIELD OF THE TECHNOLOGY

This application relates to the field of image processing of artificial intelligence technologies, and in particular, to an image processing method and apparatus, a server, a medical image processing device, and a storage medium.

BACKGROUND OF THE DISCLOSURE

Currently, a common abnormality classification method is analyzing an image including an abnormal region, to determine an abnormality category to which the abnormal region belongs and a specific location where an abnormality occurs. For example, in the medical field, endoscopic examination is performed on a patient by using an endoscope device to acquire an image, and a doctor can determine a disease of the patient and a lesion location by analyzing the image. In the field of vehicle inspection, a maintenance person or another technician can determine, by analyzing an image including a vehicle fault location, a type of the vehicle fault, a specific location where the fault occurs and where the fault is caused, and the like.

In the foregoing abnormality classification method, the acquired image is usually analyzed by a dedicated technician, to determine an abnormality type and a specific location where the abnormality occurs. In this way, in the process of abnormality classification, a large amount of manpower needs to be consumed, and the inspection efficiency is not high. Currently, with the rise of computer vision technology, it is a new trend to apply the computer vision technology to image detection. Therefore, nowadays, how to perform efficient image detection based on the computer vision technology have become a hot research issue.

SUMMARY

Embodiments of this application provide an image processing method and apparatus, a server, a medical image processing device, and a storage medium, which can efficiently perform abnormality detection on a to-be-detected image.

According to an aspect, an embodiment of this application provides an image processing method performed by a computer device, the method including:

obtaining a to-be-detected image, and performing down-sampling abnormality classification processing on the to-be-detected image, to obtain a predicted abnormality category label and a target feature image;

performing preliminary abnormality positioning processing based on the predicted abnormality category label and the target feature image, to obtain an initial positioning image corresponding to the to-be-detected image;

performing up-sampling abnormality positioning processing on the initial positioning image, to obtain a target positioning image corresponding to the to-be-detected image; and outputting the predicted abnormality category label and the target positioning image, the initial positioning image and the target positioning image being configured for reflecting attribute information of a target region associated with the predicted abnormality category label within the to-be-detected image.

According to another aspect, an embodiment of this application provides a server, including:

a processor, adapted to implement one or more instructions; and a computer storage medium, storing one or more instructions, the one or more instructions being adapted to be loaded by the processor to perform the foregoing image processing method.

According to another aspect, an embodiment of this application provides a non-transitory computer storage medium, storing one or more instructions, the one or more instructions being adapted to be loaded by a processor to perform the foregoing image processing method.

According to another aspect, an embodiment of this application further provides a computer program product or a computer program, the computer program product or the computer program including computer instructions, the computer instructions being stored in a computer-readable storage medium. A processor of a computer device reads the computer instructions from the computer-readable storage medium, and executes the computer instructions to cause the computer device to perform the foregoing image processing method.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
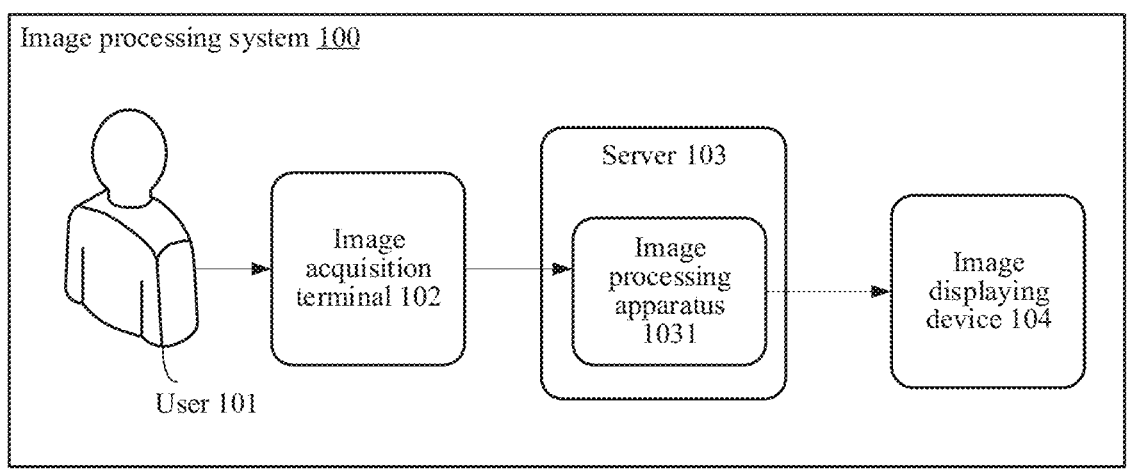
FIG. 1a is a schematic structural diagram of an image processing system according to an embodiment of this application.

With the research and progress of the artificial intelligence technology, the artificial intelligence technology is studied and applied in a plurality of fields, such as a common smart home, a smart wearable device, a smart medical care, and a smart speaker. It is believed that with the development of technologies, the artificial intelligence technology will be applied in more fields and play an increasingly important role. The solutions provided in the embodiments of this application relate to the computer vision technology in the artificial intelligence technology. The computer vision (CV) technology can use a camera and a smart terminal instead of human eyes to recognize, track, and measure a target object, to output, through processing, an image that is more suitable for human observation or that is transmitted to a specific instrument for detection. The following clearly and completely describes the technical solutions in embodiments of this application with reference to the accompanying drawings in the embodiments of this application.

It is found in a research on abnormality detection by using an image that, an image detection model configured for detecting an abnormality category and positioning the abnormality may be trained in advance. When a to-be-detected image needs to be detected, the pre-trained image detection model is invoked to analyze the to-be-detected image, so as to obtain an abnormality category included in the to-be-detected image and attribute information of an abnormal region where an abnormality occurs. The attribute information may include a specific location and size of the abnormal region. In different application fields, the abnormal region has different meanings. For example, in the medical field, the so-called abnormal region may refer to a lesion region. In the vehicle field, the abnormal region may refer to a faulty vehicle component. In other fields, the abnormal region may refer to a region where a specific object is located. For example, if the to-be-detected image includes a cloud, the sun, and an airplane, a location where the cloud, the sun, or the airplane is located may be referred to as an abnormal region of the to-be-detected image.

In the prior art, the image detection model is trained based on regular supervised learning. Training the image detection model based on regular supervised learning refers to that a label corresponding to a training sample has the same granularity as the function of the image detection model. However, in such a model, abnormality category labels and abnormality positioning labels need to be manually annotated on training samples, which has a heavy work load and is cumbersome.

In addition, in some fields, it is difficult to achieve annotation of abnormality positioning. For example, in the medical field, more manpower and material resources are required to annotate a location and a size of a lesion, which is difficult to achieve. Once there is a fault in annotation, the accuracy of abnormality positioning of the image detection model is seriously affected.

In view of this, in the embodiments of this application, the image detection model is trained in training manner based on weakly supervised learning. The weakly supervised learning refers to that a granularity of a label corresponding to a training sample is lower than a granularity of the function of the image detection model. For example, the image detection model is configured for classifying and recognizing a disease in an endoscope image and positioning a lesion region where there is a disease. In this case, the training sample only needs to have a corresponding disease category label. Compared with the prior art, in such a method, the step of annotating a positioning label is omitted, which can save manpower and material resources, and also avoid the impact of a positioning label error on the accuracy of the image detection model.

FIG. 1a is a schematic structural diagram of an image processing system according to an embodiment of this application. As shown in FIG. 1a, an image processing system 100 includes a user 101, an image acquisition terminal 120, a server 103, and an image displaying device 104. The server 103 includes a processor and a memory. A method embodiment in this application is performed by the processor by executing instructions stored in the memory. Specifically, the server 103 includes an image processing apparatus 1031.

The image acquisition terminal 120 refers to any type of smart terminal having an image acquisition function. During acquisition of a medical image, the image acquisition terminal 120 is specifically a medical image acquisition device with a camera, for example, an endoscope device, to perform endoscopic examination on the user 101. A video collection module disposed on the endoscope device collects endoscopic video data, and transmits acquired frames of images to the server 103.

The server 103 recognizes, tracks, and detects a target object. Specifically, the image processing apparatus 1031 may process a to-be-detected image, to obtain a predicted abnormality category label and a target positioning image, and transmit the images to the image displaying device 104 for display. For example, a detection result is showed to a doctor, to learn whether there is an abnormality in a detected part of the user 101, and to obtain an image of the lesion part if there is an abnormality.

The server 110 may be a server, or a server cluster that includes several servers, or a cloud computing service center.

Figure 1B:
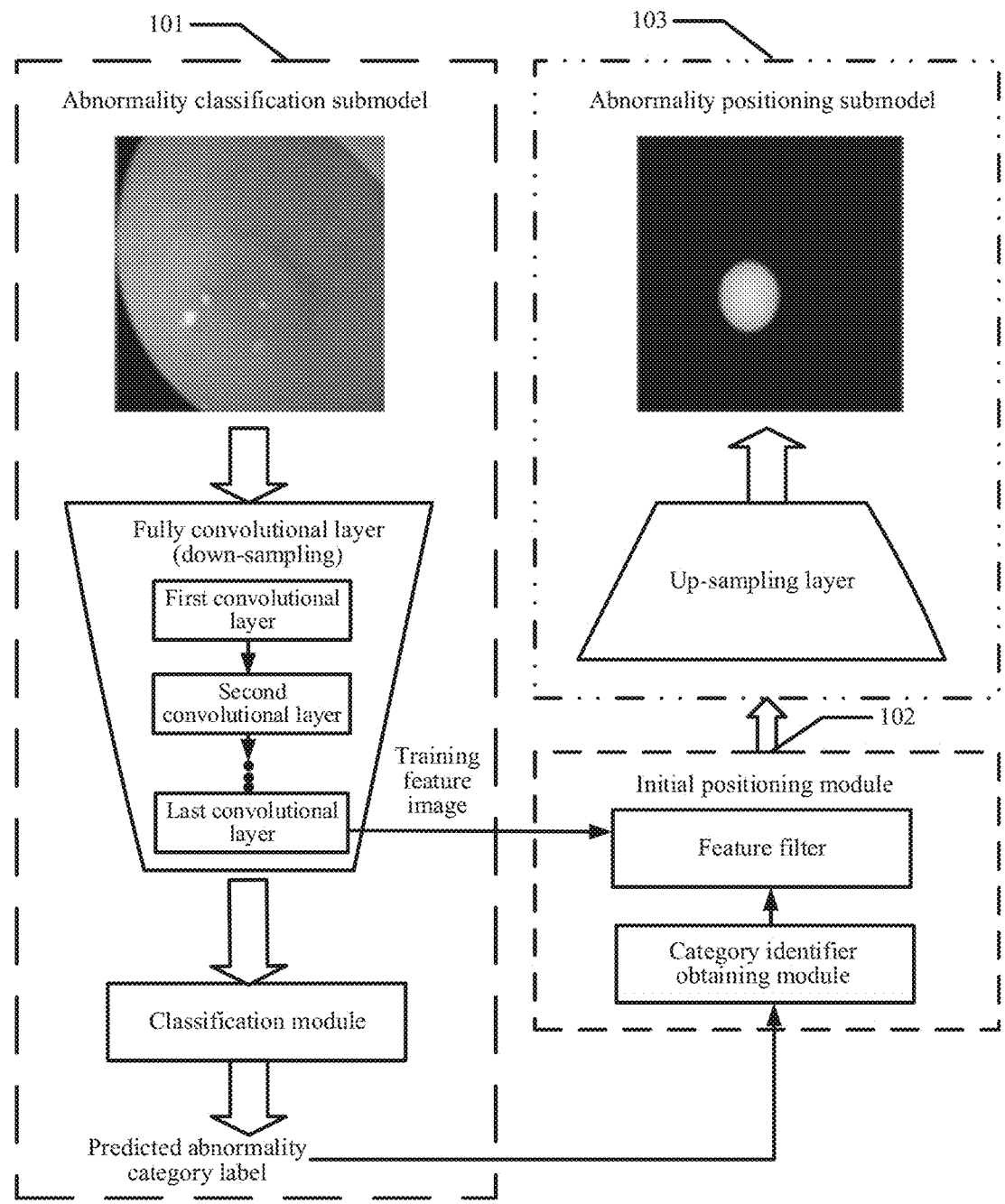
FIG. 1b is a schematic structural diagram of an image detection model according to an embodiment of this application.

FIG. 1b is a schematic structural diagram of an image detection model according to an embodiment of this application. The schematic structural diagram of FIG. 1b may include an abnormality classification submodel 101, an initial positioning module 102, and an abnormality positioning submodel 103. The abnormality classification submodel 101 is configured for performing down-sampling abnormality classification processing, the initial positioning module 102 is configured to perform preliminary abnormality positioning based on a result of the down-sampling abnormality classification processing, and the abnormality positioning submodel 103 is configured for performing up-sampling abnormality positioning processing based on a result of the preliminary abnormality positioning.

In an embodiment, the abnormality classification submodel 101 may be a model that has been trained and has an abnormality classification capability, and may be directly configured for performing down-sampling abnormality classification processing. Alternatively, the abnormality classification submodel 101 may be a model that is not trained. During abnormality positioning, both the initial positioning module 102 and the abnormality positioning submodel 103 need to directly or indirectly relay on a processing result of the abnormality classification submodel 101. Therefore, to ensure the accuracy of abnormality positioning, it needs to be first ensured that the result of the down-sampling abnormality classification processing performed by the abnormality classification submodel 101 is relatively accurate. If the abnormality classification submodel 101 is a model that is not trained, during training of the image detection model, the abnormality classification submodel 101 needs to be first trained.

In an embodiment, the abnormality classification submodel 101 may be any type of image recognition model having an image recognition function. In some embodiments, a convolutional neural network model became a currently common image recognition model due to a strong feature extraction performance. In the embodiments of this application, the abnormality classification submodel 101 may be a convolutional neural network model, for example, any one of a res-net model, a dense-net model, a VGG model, and a GoogleNet model.

In an embodiment, the convolutional neural network model mainly includes a fully convolutional layer configured for feature extraction, a pooling layer configured for reducing an amount of inputted data, a fully connected layer configured for calculating a classification value of the classification according to an output of the pooling layer, and a softmax layer configured for further performing classification processing and outputting a classification result. The pooling layer may include a global average pooling layer, a max pooling layer, an overlapping pooling layer, and the like. Different convolutional neural network models have different pooling layers. Different convolutional layers are configured for extracting different features, to obtain feature images, and a feature image obtained by a previous convolutional layer is used as an input of a next convolutional layer. The feature to be extracted by each of the convolutional layers may be set according to a specific function or may be artificially set.

For example, for image recognition of graphics, a first convolutional layer may be configured for extracting an overall shape feature of a graph, a second convolutional layer may be configured for extracting a line feature of the graph, and a third convolutional layer may be configured for extracting a discontinuous feature of the graph. In another example, for recognition of images including a human face, the first convolutional layer may be configured for extracting a contour feature of the human face, and the second convolutional layer may be configured for extracting facial part features of the human face. Each convolutional layer includes a plurality of feature extraction channels, and each feature extraction channel includes a plurality of filters that are of the same size and are configured to perform convolution calculation.

As shown in FIG. 1b, the abnormality classification submodel 101 specifically includes a fully convolutional layer (also referred to as a down-sampling layer) and a softmax layer. The fully convolutional layer includes a plurality of convolutional layers. In the embodiments of this application, the abnormality classification submodel 101 further includes a global average pooling layer and a fully connected layer (not shown in FIG. 1b). The global average pooling layer is located between the fully convolutional layer and the fully connected layer, and the fully connected layer is connected to the softmax layer.

In some embodiments, the abnormality classification submodel 101 is trained based on first sample images and abnormality category supervisory labels corresponding to the first sample images. The specific training process is described below in detail.

In an embodiment, after training of the abnormality classification submodel 101 is completed, the abnormality positioning submodel 103 is trained based on the trained abnormality classification submodel 101 and the initial positioning module 102.

A specific process may be: obtaining a second sample image, where the second sample image may be the same as or different from the first sample image; invoking the trained abnormality classification submodel 101 to performs abnormality classification processing on the second sample image, to obtain an abnormality category training label; and extracting a training feature image generated in the process of performing abnormality classification processing on the second sample image. The training feature image may be obtained by the last convolutional layer of the fully convolutional layer of the abnormality classification submodel 101 by performing feature extraction.

Next, the initial positioning module 102 performs abnormality positioning processing based on the training feature image and the abnormality category training label, to obtain a first positioning image by performing abnormality positioning on an abnormal region in the second sample image. The initial positioning module 102 may include a feature filter and a category identifier obtaining module. The feature filter is configured to process the training feature image, and the category identifier obtaining module is configured to obtain a category identifier corresponding to the abnormality category training label. The category identifier may be an identifier number corresponding to an abnormality category indicated by the abnormality category training label. For example, an identifier number 0 corresponds to no abnormality, an identifier number 1 corresponds to an abnormality category 1, and an identifier number 2 corresponds to an abnormality category 2.

Further, the initial positioning module invokes the abnormality positioning submodel 103 to perform abnormality positioning processing on the first positioning image, to obtain a second positioning image. Finally, the initial positioning module determines, according to the second positioning image and the second sample image, a value of a target loss function configured for training the abnormality positioning submodel 103, and optimizes the abnormality positioning submodel 103 in a direction of reducing the value of the target loss function, to finally obtain the trained abnormality positioning submodel.

In an embodiment, completing training of the abnormality positioning submodel 103 means that training of the image detection model is completed. When a to-be-detected image is obtained, the to-be-detected image may be processed by invoking submodels or modules in the trained image detection model, to obtain an abnormality category, an abnormal location where an abnormality occurs, and a size of an abnormal region that are included in the to-be-detected image.

Figure 2:
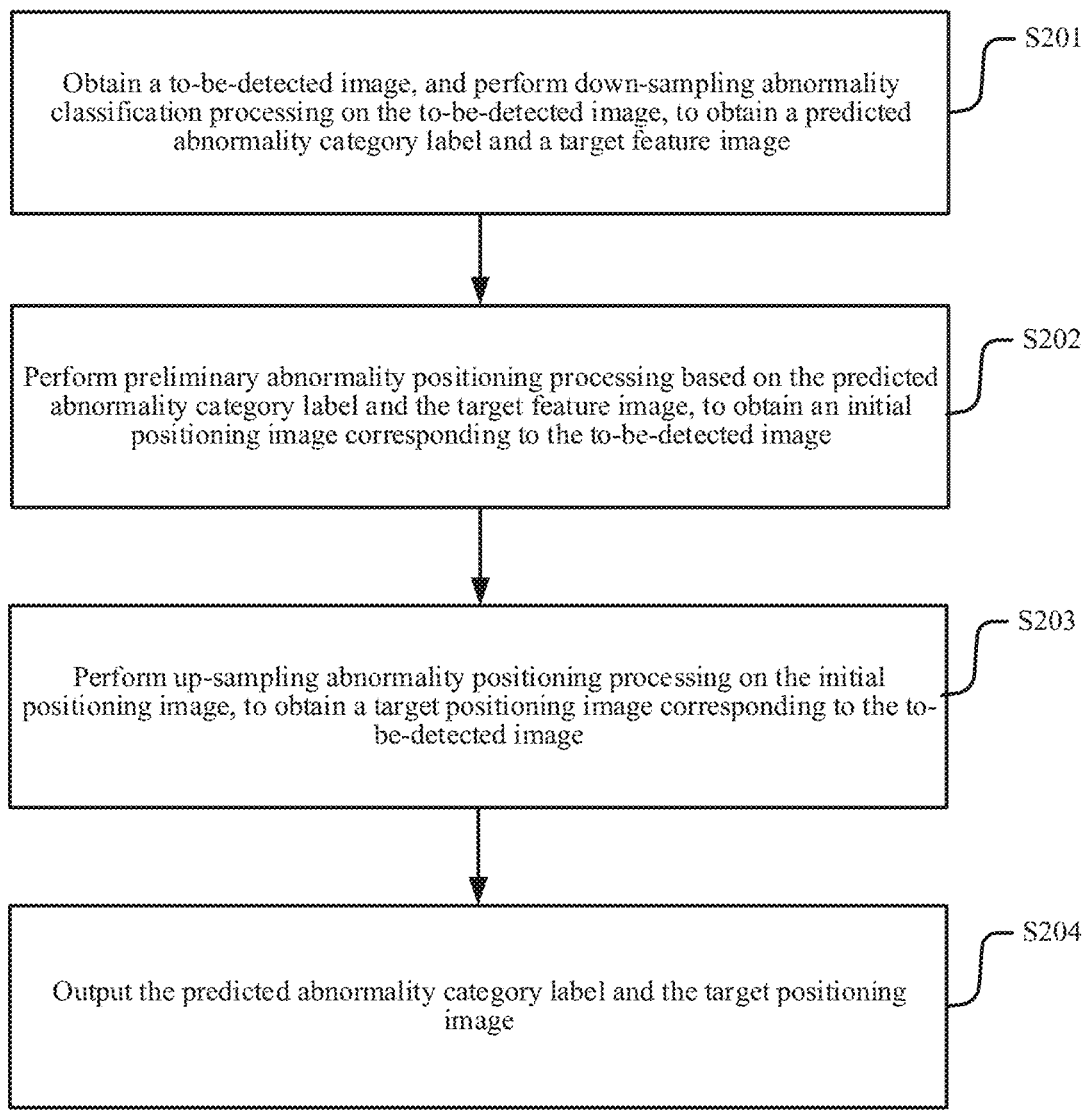
FIG. 2 is a schematic flowchart of an image processing method according to an embodiment of this application.

Based on the foregoing image detection model, an embodiment of this application provides an image processing method. FIG. 2 is a schematic flowchart of an image processing method according to an embodiment of this application. The image processing method shown in FIG. 2 may be performed by a server, for example, the server 103 shown in FIG. 1a, and specifically, may be performed by a processor of the server. The image processing method shown in FIG. 2 may include the following steps:

Step S201. Obtain a to-be-detected image, and perform down-sampling abnormality classification processing on the to-be-detected image, to obtain a predicted abnormality category label and a target feature image.

In an embodiment, the to-be-detected image may be transmitted by a terminal. For example, a doctor performs endoscopic examination on a patient by using an endoscope device. A video collection module disposed on the endoscope device collects endoscopic video data, and a terminal connected to the endoscope device or the endoscope may perform image framing on the video data, to obtain a plurality of frames of images. Further, the plurality of obtained frames of images are used as to-be-detected images and are transmitted to the server. In other embodiments, the server may alternatively receive video data transmitted by the terminal, and perform image framing on the video data, to obtain the to-be-detected image.

The predicted abnormality category label is configured for reflecting whether there is an abnormality in the to-be-detected image, and reflecting, if there is an abnormality, a category of the abnormality. For example, if the to-be-detected image is a medical image, the predicted abnormality category label may indicate whether there is a disease in the to-be-detected image, and indicate, if there is a disease, a type of the disease, for example, a tumor, gastric cancer, or liver cirrhosis. The predicted abnormality category label may include a target category identifier configured for indicating an abnormality, or a probability of the existence of the abnormality. For example, a target category identifier indicating no abnormality is set to 0 in advance, a category identifier of an abnormality category 1 is set to 1, and a category identifier of an abnormality category 2 is set to 2. Based on the foregoing description, the predicted abnormality category label may be (1, 60%) or (2, 40%). The numbers 1 and 2 indicate category identifiers, and the percentages indicate probabilities of the existence of corresponding abnormality categories.

In an embodiment, there is one predicted abnormality category label. If a plurality of predicted abnormality category labels are obtained by performing abnormality classification on the to-be-detected image, a predicted abnormality category label with the highest confidence is selected as a predicted abnormality category label corresponding to the to-be-detected image.

In an embodiment, an objective of performing down-sampling abnormality classification processing on the to-be-detected image is to determine whether there is an abnormality in the to-be-detected image, and determine, if there is an abnormality, a category of the abnormality. In an embodiment, a manner of performing down-sampling abnormality classification processing on the to-be-detected image may include: performing convolution processing on the to-be-detected image by using at least one convolution module, to extract a feature included in the to-be-detected image; and performing abnormality detection based on the extracted feature, to obtain the predicted abnormality category label. In some embodiments, the at least one convolution module may be directly disposed in the server.

Alternatively, an abnormality classification submodel may run in the server. When down-sampling abnormality classification processing is performed on the to-be-detected image by using the abnormality classification submodel, the method specifically includes: obtaining an abnormality classification submodel, the abnormality classification submodel including at least one first sampling module; and invoking the at least one first sampling module to perform convolution processing on the to-be-detected image, to extract a feature included in the to-be-detected image; performing abnormality detection based on the extracted feature, to obtain the predicted abnormality category label; and determining a feature image outputted by the last sampling module in the at least one first sampling module as the target feature image.

As shown in FIG. 1b, the abnormality classification submodel may include convolutional layers, and the at least one first sampling module is specifically a convolution module, which corresponds to the convolutional layer of the abnormality classification submodel. An example in which the convolution module is the convolutional layer of the abnormality classification submodel is used for description below.

It may be learned from the above that the abnormality classification submodel is mainly configured for performing abnormality classification on the to-be-detected image, to obtain the predicted abnormality category label of the to-be-detected image. The abnormality classification submodel may be trained based on first sample images and abnormality category supervisory labels corresponding to the first sample images. The abnormality category supervisory label reflects whether there is an abnormality in the first sample image, and reflects, if there is an abnormality, a category of the abnormality. The abnormality category supervisory label may be obtained by manually annotating the first sample image. Alternatively, the abnormality category supervisory label may be obtained by jointly using manual annotation and an annotation model.

Each convolutional layer of the abnormality classification submodel includes a plurality of feature extraction channels, and each feature extraction channel includes a plurality of filters that are of the same size and are configured to perform convolution calculation. Based on this, the performing convolution processing on the to-be-detected image by using at least one convolution module may include: performing convolution processing on the to-be-detected image by using a plurality of filters in the at least one convolution module.

During specific implementation, the performing convolution processing on the to-be-detected image refers to that each convolution module performs convolution processing on the to-be-detected image, to obtain a corresponding feature image, and uses the feature image as an input of a next convolution module, so that the next convolution module performs convolution processing on the feature image. The reset is deduced by analogy, until the last convolution module outputs a feature image of the last layer after performing convolution processing. The feature image of the last layer includes spatial structure information of the to-be-detected image.

In step S201, the target feature image refers to a feature image generated in the process of performing down-sampling abnormality classification processing on the to-be-detected image. To obtain an initial positioning image having relatively high accuracy in the subsequent process of performing preliminary abnormality positioning processing based on the target feature image and the predicted abnormality category label, in the embodiments of this application, a feature image outputted by the last convolution module is determined as the target feature image.

Step S202. Perform preliminary abnormality positioning processing based on the predicted abnormality category label and the target feature image, to obtain an initial positioning image corresponding to the to-be-detected image.

The initial positioning image may be configured for roughly reflecting attribute information of a target region associated with the predicted abnormality category label, and the attribute information includes a location and a size of the target region. If the predicted abnormality category label indicates that there is no abnormality in the to-be-detected image, the target region associated with the predicted abnormality category label does not exist. If the predicted abnormality category label indicates that there is an abnormality of a certain type in the to-be-detected image, the target region associated with the predicted abnormality category label refers to a region where such an abnormality occurs. In some embodiments, the attribute information of the target region may be displayed in a form of annotation box. A location of the annotation box indicates a location of the region where the abnormality occurs, and a size of the annotation box indicates a size of the region where the abnormality occurs.

In an embodiment, an implementation of performing preliminary abnormality positioning processing based on the predicted abnormality category label and the target feature image, to obtain an initial positioning image corresponding to the to-be-detected image may be: performing preliminary abnormality positioning processing based on a target category identifier corresponding to the predicted abnormality category label and the target feature image, to obtain the initial positioning image. The target category identifier corresponding to the predicted abnormality category label is configured for uniquely identifying an abnormality indicated by the predicted abnormality category label. The target category identifier may be an abnormality category number, and the abnormality category number may be set in advance. For example, in the medical field, it may be set that an abnormality category number 0 indicates no lesion, an abnormality category number 1 indicates gastritis, an abnormality category number 2 indicates enteritis, an abnormality category number 3 indicates gastric cancer, and the like.

In some embodiments, in step S202, the performing preliminary abnormality positioning processing based on the predicted abnormality category label and the target feature image, to obtain an initial positioning image corresponding to the to-be-detected image includes: obtaining a target category identifier corresponding to the predicted abnormality category label; and invoking an initial positioning module, obtaining a target feature weight vector corresponding to the target category identifier, and superimposing the target feature weight vector and the target feature image, to obtain the initial positioning image.

The initial positioning module may be a module disposed in the server, or may be a stand-alone module. In some embodiments, the initial positioning module may include a feature filter and a category identifier obtaining module. The initial positioning module may obtain a target category identifier by using the category identifier obtaining module, and the feature filter is configured to obtain a target feature weight vector corresponding to the target category identifier.

In an embodiment, an implementation of obtaining a target category identifier corresponding to the predicted abnormality category label may be that: the server may preset a correspondence between a plurality of abnormality categories and category numbers, and determine, when the predicted abnormality category label is obtained by performing down-sampling abnormality classification processing on the to-be-detected image, an abnormality indicated by the predicted abnormality category label. Further, the category identifier obtaining module searches the preset correspondence for and determines a target category identifier corresponding to the abnormality.

In other embodiments, an implementation of obtaining a target category identifier corresponding to the predicted abnormality category label may further be: receiving, by the category identifier obtaining module, the target category identifier transmitted by the terminal. It is to be understood that after the predicted abnormality category label is determined in step S201, the predicted abnormality category label may be transmitted to the terminal, and the terminal displays the predicted abnormality category label on a user interface of the terminal for a user to view. If the user desires to further perform abnormality positioning on the to-be-detected image, the user may input a trigger operation of positioning processing in the user interface of the terminal. For example, the user interface of the terminal may include an option for triggering abnormality positioning, and when the user clicks the option, it indicates that the user inputs the trigger operation of positioning processing. When inputting the trigger operation, the user may also select or input a target category identifier corresponding to the predicted abnormality category label in the user interface. When detecting the trigger operation, the terminal transmits the target category identifier inputted by the user to the category identifier obtaining module.

In an embodiment, if there are at least two predicted abnormality category labels, when inputting the trigger operation of positioning processing in the user interface, the user may further point that positioning processing is to be performed on an abnormality indicated by which predicted abnormality category label.

It may be learned from the above that the abnormality classification submodel may further include a fully connected layer and a pooling layer. The pooling layer is configured for performing reduction processing on the target feature image outputted by the last convolutional layer. For example, the target feature image outputted by the last convolutional layer is represented as [N, 7, 7, 2048]. N represents a quantity of feature extraction channels, 2048 represents a quantity of filters in each feature extraction channels, and 7*7 represents a size of the filter. A feature image obtained after global average pooling is performed on the target feature image is [N, 1, 1, 2048]. The fully connected layer is configured for calculate a classification value according to the target feature image after pooling.

Figure 3:
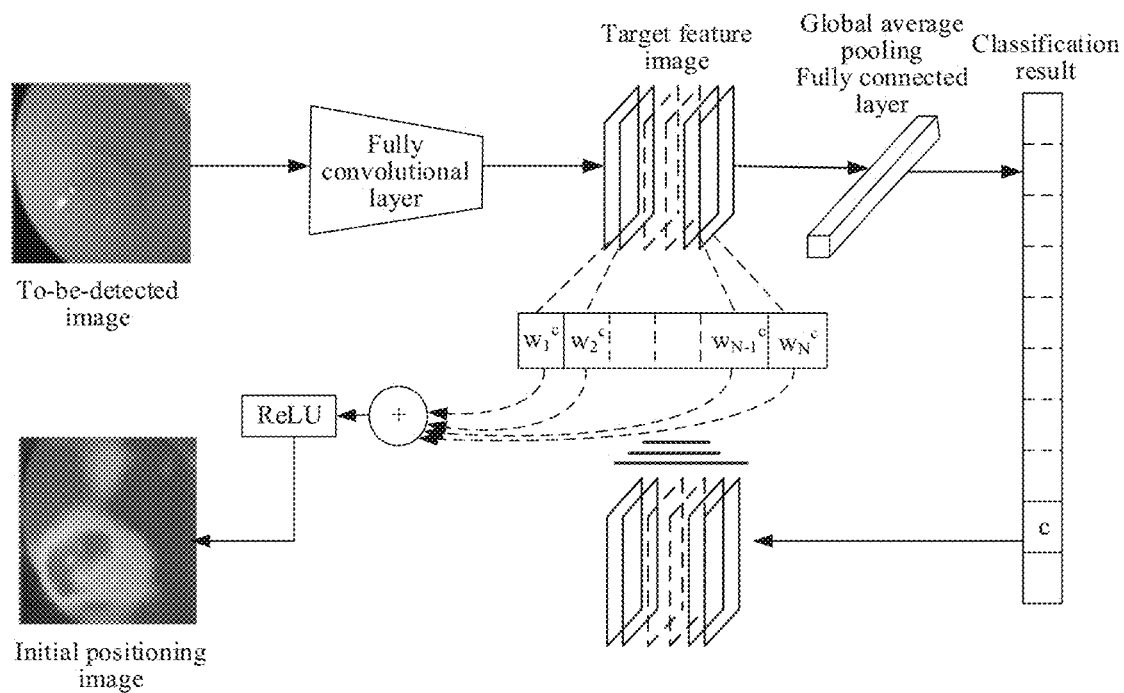
FIG. 3 is a schematic diagram of determining a target feature weight vector according to an embodiment of this application.

In an embodiment, to obtain the target feature weight vector corresponding to the target category identifier, two methods are commonly used: one is a method without training, and the other is a method requiring training. FIG. 3 is a schematic diagram of determining a target feature weight vector and an initial positioning image by using a method without training according to an embodiment of this application.

In FIG. 3, the inputted to-be-detected image passes through a fully convolutional layer, to obtain a target feature image; then, global average pooling is performed on the target feature image, and the target feature image is finally inputted into a fully connected layer, to obtain a classification result. After global average pooling is performed on the target feature image, for each abnormality category x, a target feature image of each channel after pooling has a corresponding weight parameter, which may be represented as $w_k^x$. x represents an abnormality category, k represents the target feature image of each channel after pooling, where a value of k may range from 1 to N, and N represents a quantity of channels. Further, a weight parameter associated with the abnormality indicated by the target category identifier is selected from $w_k^x$ as the target feature weight vector. For example, an abnormality category indicated by the target category identifier is c, and a weight parameter corresponding to the abnormality category c is selected from $w_k^x$ as the target feature weight vector, which may be represented as $w_k^c$.

Further, weighting processing is performed on the target feature weight vector corresponding to the abnormality category c and the target feature image before pooling, to obtain a heat map. The heat map is the initial positioning image.

In an embodiment, after weighting processing is performed on the target feature weight vector and the target feature image, a ReLU is further added. Pixels that do not belong to the abnormality category c may be filtered by adding the ReLU, and pixels affecting the abnormality category c may be enhanced.

In FIG. 3, when the target feature weight vector is determined, the fully connected layer is a fully connected layer with global average pooling instead of a conventional fully connected layer. This is because the conventional fully connected layer directly stretches a plurality of layers of neurons of the fully convolutional layer to a vector, destroying spatial structure information between pixels, and a large quantity of parameters are included. By using the method of global average pooling, spatial information included in the target feature image can be reserved, thereby helping position a target abnormal region.

A method of obtaining the target feature weight vector through training mainly draws on the idea of embedding. The essence of embedding is also to learn a mapping relationship, that is, mapping from a semantic space (a category number) to a vector space (a weight vector of a feature image in each channel). For example, assuming that a total quantity of abnormality categories is m, and a parameter of embedding is $emb_m^N$, a size of an obtained vector is [m, N]. Assuming that the target category identifier is a vector selector (for example, a target category identifier 0: [0]), a size of a vector embedding_vec obtained after the embedding operation is [1, N]. That is, the abnormality category 0 is correspondingly mapped to a vector in an N-length vector space, and after different category identifiers are inputted and the embedding operation is performed, different vectors in the N-length vector space may be obtained. After the N-length vector is multiplied with the target feature image F_n(x, y), an activation vector is obtained, that is, activation_vec(x, y)=sigmoid(F_n(x, y)*embedding_vec). The vector may be understood as a weight vector of a corresponding abnormality in the feature image. Finally, the initial positioning image is obtained by performing weighting on activation_vec*F_n(x, y).

Step S203. Perform up-sampling abnormality positioning processing on the initial positioning image, to obtain a target positioning image corresponding to the to-be-detected image.

Figures 4A, 4B:
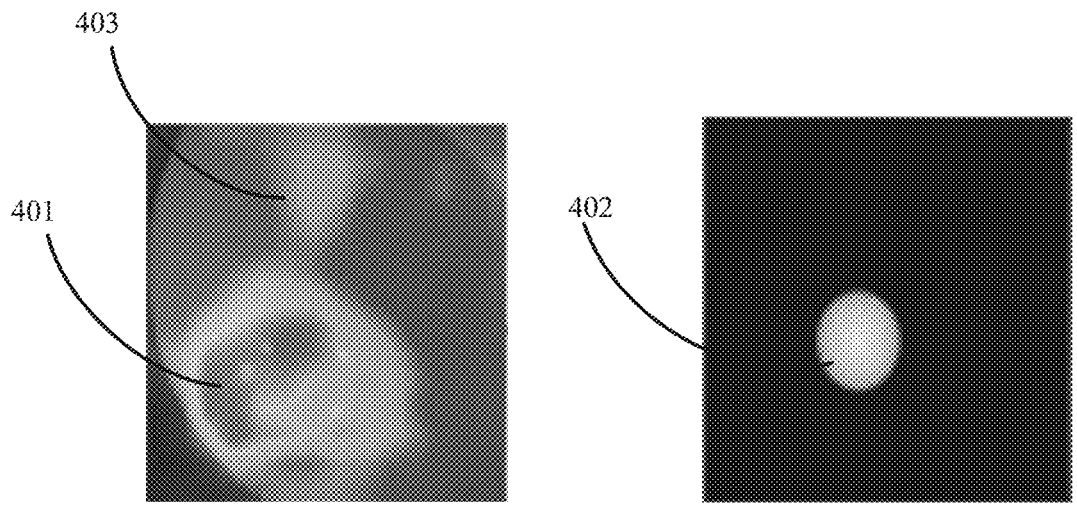
FIG. 4a is a schematic diagram of an initial positioning image according to an embodiment of this application.
FIG. 4b is a schematic diagram of a target positioning image according to an embodiment of this application.

Compared with the initial positioning image in step S202, the target positioning image may be configured for precisely reflecting attribute information of a target region associated with the predicted abnormality category label. FIG. 4a is a schematic diagram of an initial positioning image according to an embodiment of this application, and FIG. 4b is a schematic diagram of a target positioning image according to an embodiment of this application. In FIG. 4a, 401 represents the target region. In FIG. 4b, 402 represents the target region. It may be seen from the drawings that in FIG. 4a, not only the target region is vaguely seen, but also another region 403 may be seen. However, in FIG. 4b, a location and size of the target region can be clearly seen, and another region is invisible.

In an embodiment, an implementation of performing up-sampling abnormality positioning processing on the initial positioning image, to obtain a target positioning image may be: obtaining an abnormality positioning submodel, the abnormality positioning submodel including at least one second sampling module, a quantity of first sampling modules included in the abnormality classification submodel being greater than a quantity of second sampling modules; and invoking the at least one second sampling module, to perform up-sampling abnormality positioning processing on the initial positioning image, to obtain the target positioning image.

In an embodiment, a specific manner of obtaining an abnormality positioning submodel includes: obtaining a second sample image; invoking the abnormality classification submodel to perform down-sampling abnormality classification processing on the second sample image, to obtain an abnormality category training label; invoking the initial positioning module to perform preliminary abnormality positioning processing on the abnormality category training label, to obtain a first positioning image; and training the abnormality positioning submodel based on the abnormality category training label and the first positioning image. A specific process of training is to be described in the following embodiments.

In an embodiment, the abnormality classification submodel, the initial positioning module, and the abnormality positioning submodel may form an image detection model. The image detection model may be configured for detecting a to-be-detected image, and outputting a predicted abnormality category label corresponding to the to-be-detected image and a target positioning image corresponding to the to-be-detected image. In other embodiments, the abnormality classification submodel, the initial positioning module, and the abnormality positioning submodel may be three independent models. The server may invoke the abnormality classification submodel to perform step S201, invoke the initial positioning module to perform step S202, and invoke the abnormality positioning submodel to perform step S203. In the following description of the embodiments of this application, using an example in which the abnormality classification submodel, the initial positioning module, and the abnormality positioning submodel form an image detection model, a schematic diagram of the image detection model may be shown in FIG. 1b.

Step S204. Output the predicted abnormality category label and the target positioning image.

In an embodiment, after obtaining the target positioning image corresponding to the to-be-detected image, the server may output both the predicted abnormality category label and the target positioning image to the terminal, and the terminal displays the predicted abnormality category label and the target positioning image on the user interface for a user to view.

In an embodiment, it is assumed that in step S201, the abnormality classification submodel in the image detection model shown in FIG. 1b is invoked to perform down-sampling abnormality classification processing on the to-be-detected image, to obtain the predicted abnormality category label and the target feature image. The down-sampling abnormality classification processing includes convolution processing performed on the to-be-detected image by a plurality of convolution modules of the abnormality classification submodel, and the target feature image may be obtained by the last convolution module by performing convolution processing. In step S202, the initial positioning image obtained based on the target feature image and the predicted abnormality category label has relatively low resolution, so that up-sampling finishing processing needs to be further performed on the initial positioning image by using step S203, to obtain a target positioning image with relatively high resolution.

Figure 5:
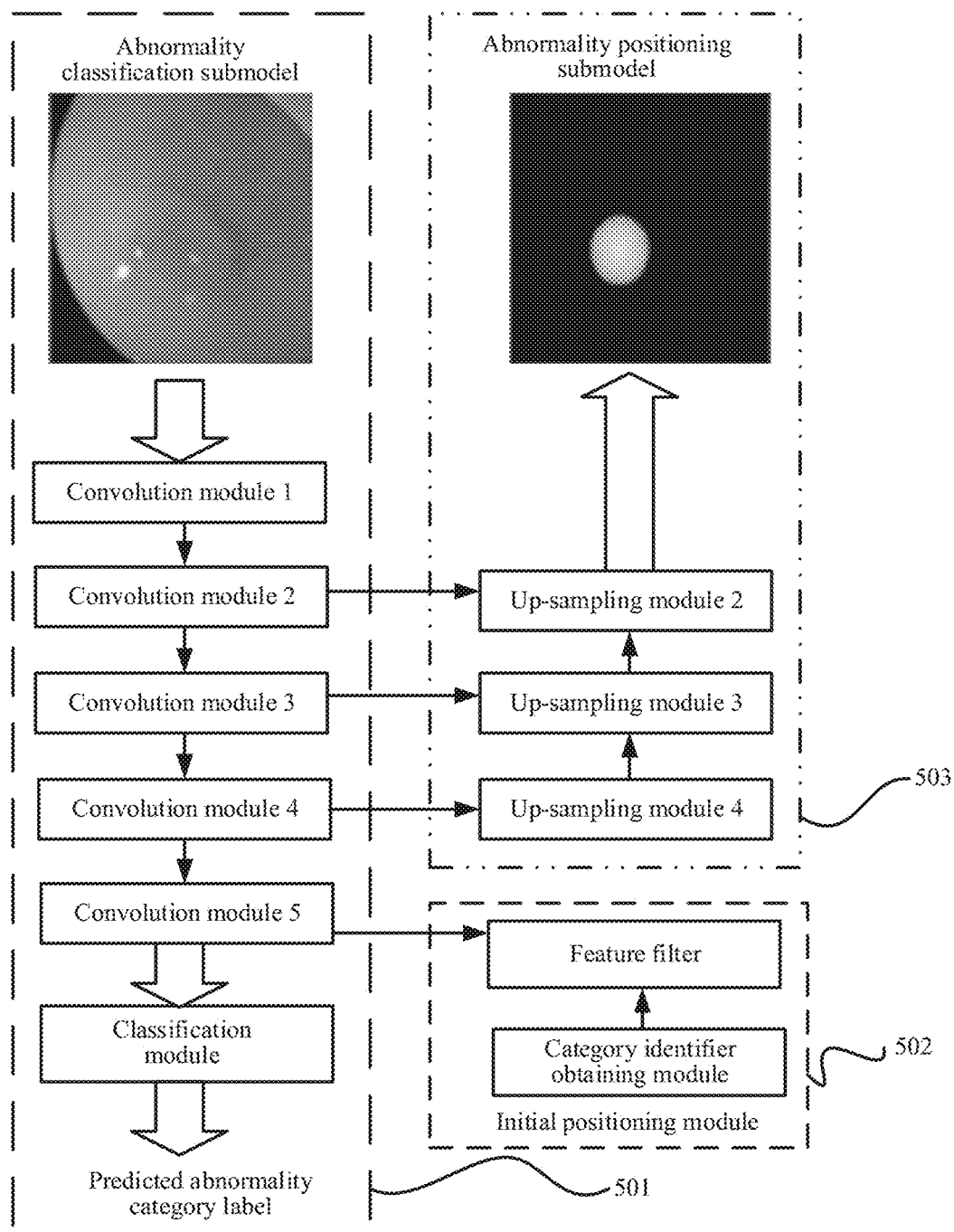
FIG. 5 is a schematic structural diagram of another image detection model according to an embodiment of this application.

In an embodiment, to obtain a clear target positioning image with relatively high resolution, a quantity of convolution modules for performing down-sampling processing in the abnormality classification submodel is to be greater than a quantity of up-sampling modules for performing up-sampling processing in the abnormality positioning submodel. For example, FIG. 5 is a schematic structural diagram of another image detection model according to an embodiment of this application, 501 represents an abnormality classification submodel, 502 represents an initial positioning module, and 503 represents an abnormality positioning submodel. It is assumed that the abnormality classification submodel 501 is a resent-50 model in a convolutional neural network model, and the resent-50 model includes five convolution modules and a softmax layer. A size of a to-be-detected image is 224*224. After down-sampling processing is performed by the five convolution modules for five times, a target feature image with a size of 7*7 is obtained. The initial positioning module performs initial positioning processing on the target feature image, to obtain an initial positioning image, and a size of the initial positioning image does not change and is still 7*7. Further, the abnormality positioning submodel 503 performs up-sampling processing on the initial positioning image for three times, to obtain a target positioning image with a size of 56*56. A length of a side of the target positioning image is only ¼ of the to-be-detected image, and then the size of the target positioning image is restored to 224*224 by using a method of interpolation.

The reason why abnormality positioning submodel does not directly use five up-sampling modules is that in the image detection model shown in FIG. 5, there is a shortcut between the abnormality classification submodel 501 and the abnormality positioning submodel 503. By using such a structure, the to-be-detected image may be fused, so as to perform feature alignment. In addition, the feature images in a higher level include semantics in a lower level. During positioning, the abnormality positioning submodel 503 requires more high-level semantics information with determination, and excessive low-level semantics causes inaccurate positioning.

In the foregoing image detection process, down-sampling abnormality classification processing may be performed on a to-be-detected image, to obtain a predicted abnormality category label, which saves manpower and is more efficient when compared with the method of obtaining an abnormality through human analysis in the prior art. Further, in the embodiments of this application, preliminary abnormality positioning processing is performed based on the predicted abnormality category label and a target feature image obtained through down-sampling abnormality classification processing. Next, up-sampling abnormality positioning processing is performed on an initial positioning image obtained through preliminary abnormality positioning processing, to obtain a target positioning image corresponding to the to-be-detected image. It may be ensured that the obtained target positioning image is more accurate by performing positioning processing twice.

Figure 6:
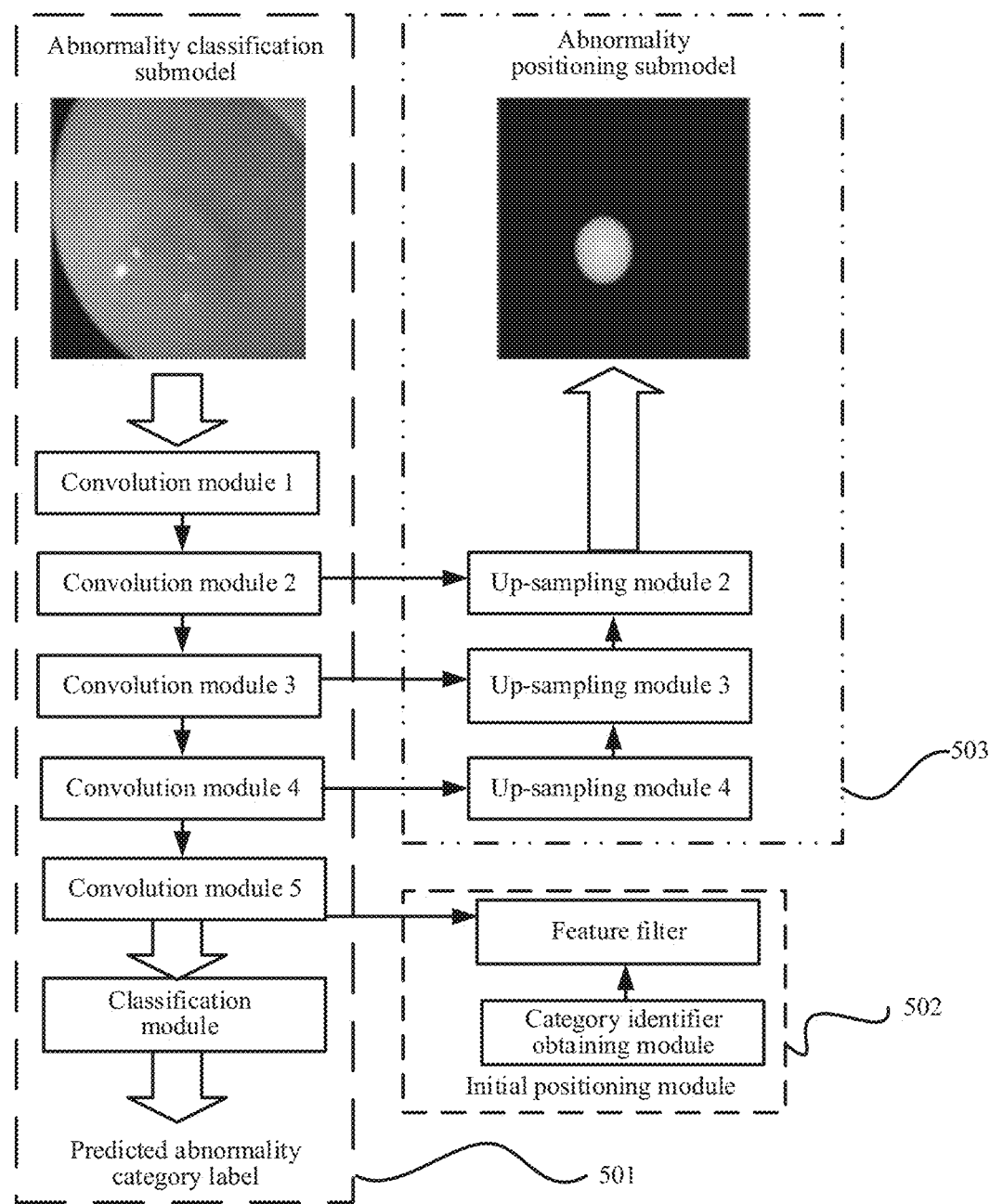
FIG. 6 is a schematic flowchart of another image processing method according to an embodiment of this application.

Based on the image processing method, an embodiment of this application further provides another image processing method. FIG. 6 is a flowchart of another image processing method according to an embodiment of this application. The image processing method shown in FIG. 6 may be performed by a server and by a server invoking an image detection model, for example, the server 103 shown in FIG. 1a. The image detection model may include an abnormality classification submodel, an initial positioning module, and an abnormality positioning submodel. The image processing method shown in FIG. 6 may include the following steps:

Step S601. Train the abnormality classification submodel based on first sample images and abnormality category supervisory labels corresponding to the first sample images.

There are a plurality of first sample images, and all the plurality of first sample images may be positive samples, that is, all the first sample images include abnormalities. In this case, an abnormality category supervisory label corresponding to each first sample image is configured for indicating an abnormality category in the first sample image. In other embodiments, to ensure that the abnormality classification submodel can accurately perform abnormality classification, the plurality of first sample images may include positive samples and negative samples, that is, some of the plurality of first sample images include abnormalities, and some of the plurality of first sample images do not include abnormalities. For the negative samples, the abnormality category supervisory label is configured for indicating that the negative samples do not include abnormalities. In the following description of the embodiments of this application, an example in which the abnormality classification submodel is trained by using only positive samples is used.

In an embodiment, an implementation of training the abnormality classification submodel based on first sample images and abnormality category supervisory labels corresponding to the first sample images may be: invoking the abnormality classification submodel to perform down-sampling abnormality classification processing on the first sample images, to obtain first abnormality category labels outputted by the abnormality classification submodel; determining a value of a first loss function based on the first abnormality category labels and the abnormality category supervisory labels; adjusting parameters of the abnormality classification submodel in a direction of reducing the value of the first loss function, and determining that the current abnormality classification submodel is optimum until the value of the first loss function reaches the minimum. In some embodiments, in this case, the first loss function may be a cross-entropy cost function.

Step S602. Train the abnormality positioning submodel based on second sample images and abnormality category training labels corresponding to the second sample images.

The second sample image may be the same as or different from the first sample image. In an embodiment, the abnormality category training labels corresponding to the second sample images are configured for reflecting abnormality categories in the second sample images. The abnormality category training labels may be obtained by invoking the trained abnormality classification submodel in step S601 to perform down-sampling abnormality classification processing. In other embodiments, the abnormality category training labels corresponding to the second sample images may be alternatively obtained by invoking another model that can perform abnormality recognition to perform abnormality classification processing on the second sample images. In the embodiments of this application, to improve the accuracy of the image detection model and cooperation between submodels, the abnormality category training labels corresponding to the second sample images are preferably obtained based on the trained abnormality classification submodel in step S601.

In an embodiment, a specific implementation of step S602 may include the following steps:

(1) obtaining a second sample image, and invoking the trained abnormality classification submodel to perform down-sampling abnormality classification processing on the second sample image, to obtain an abnormality category training label and a training feature image;

(2) obtaining a first category identifier corresponding to the abnormality category training label;

(3) invoking the initial positioning module to perform preliminary abnormality positioning processing based on the first category identifier and the training feature image, to obtain the first positioning image;

(4) invoking the abnormality positioning submodel to perform up-sampling abnormality positioning processing on the first positioning image, to obtain a second positioning image; and (5) obtaining a value of a target loss function corresponding to the abnormality positioning submodel based on the second positioning image and the second sample image, and optimizing the abnormality positioning submodel in a direction of reducing the value of the target loss function.

The first positioning image and the second positioning image are configured for reflecting attribute information of a predicted region associated with the abnormality category training label. The predicted region associated with the abnormality category training label refers to an abnormal region where an abnormality is predicted to occur.

In step (1), the training feature image may be an image obtained by the abnormality classification submodel performing the last down-sampling processing in the process of performing down-sampling abnormality classification on the second sample image. It may be learned from the above that the first category identifier may be an abnormality category number. The server may preset a correspondence between at least one group of abnormality category and abnormality category identifier, determine, when an abnormality category training label is obtained, an abnormality category indicated by abnormality category training label, further search the preset correspondence for a category identifier corresponding to the determined abnormality, and determine the searched category identifier as the first category identifier.

In an embodiment, a specific implementation in step (3) may include: obtaining a first feature weight vector corresponding to the first category identifier; and performing weighting processing on the first feature weight vector and the training feature image, to obtain the first positioning image. It may be learned from the above that the initial positioning module may include a category identifier obtaining module and a feature filter. In step (3), the initial positioning module obtains the first category identifier by using the category identifier obtaining module, and the feature filter obtains a first feature weight vector corresponding to the first category identifier from the training feature image. In some embodiments, the implementation of obtaining the first feature weight vector corresponding to the first category identifier is the same as the implementation of obtaining the target feature weight vector corresponding to the target category identifier in the embodiment shown in FIG. 2. For details, reference may be made to the foregoing description, and details are not described herein again.

In an embodiment, in step (5), the obtaining a value of a target loss function corresponding to the abnormality positioning submodel based on the second positioning image and the second sample image includes: obtaining a first optimization image and a second optimization image based on the attribute information of the predicted abnormal region included in the second positioning image and the second sample image, and invoking the abnormality classification submodel to perform abnormality classification processing respectively on the first optimization image and the second optimization image, to obtain a first probability and a second probability; obtaining an area of the predicted abnormal region in second positioning image; obtaining a value of a smoothing function configured for performing optimization smoothing on the predicted abnormal region; and determining the value of the target loss function corresponding to the abnormality positioning submodel according to the first probability, the second probability, the area of the predicted abnormal region, and the value of the smoothing function.

An expression of the target loss function may be shown in formula (1):

$$\mathcal{L}(m) = -\lambda_1 \mathcal{L}_{apply}(m,X) + \lambda_2 \mathcal{L}_{apply}(1-m,X) + \lambda_3 \mathcal{L}_A(m) + \lambda_4 \mathcal{L}_{TV}(m) \qquad (1)$$

X represents the second sample image, m represents the second positioning image, $\mathcal{L}_{apply}(m, X)$ represents the first probability, and $\lambda_1$ represents a weight value of the first probability. The first probability is configured for representing a probability that a first optimization image obtained after pointwise multiplication and other operations are performed on the predicted abnormal region included in the second positioning image and the second sample image is recognized by the abnormality classification submodel as including an abnormal region. $\mathcal{L}_{apply}(1-m, X)$ represents the second probability, and $\lambda_2$ represents a weight value of the second probability. A region corresponding to the predicted abnormal region is removed from the second sample image, to obtain a second optimization image, and the second probability is configured for representing a probability that the second optimization image is recognized by the abnormality classification submodel as including an abnormal region. $\mathcal{L}_A(m)$ represents an area of the predicted abnormal region in the second positioning image, and $\lambda_3$ represents a weight value of the area. It is to be understood that the second positioning image outputted by the abnormality positioning submodel may be a mask with the same size of the second sample image.

Figure 7A:
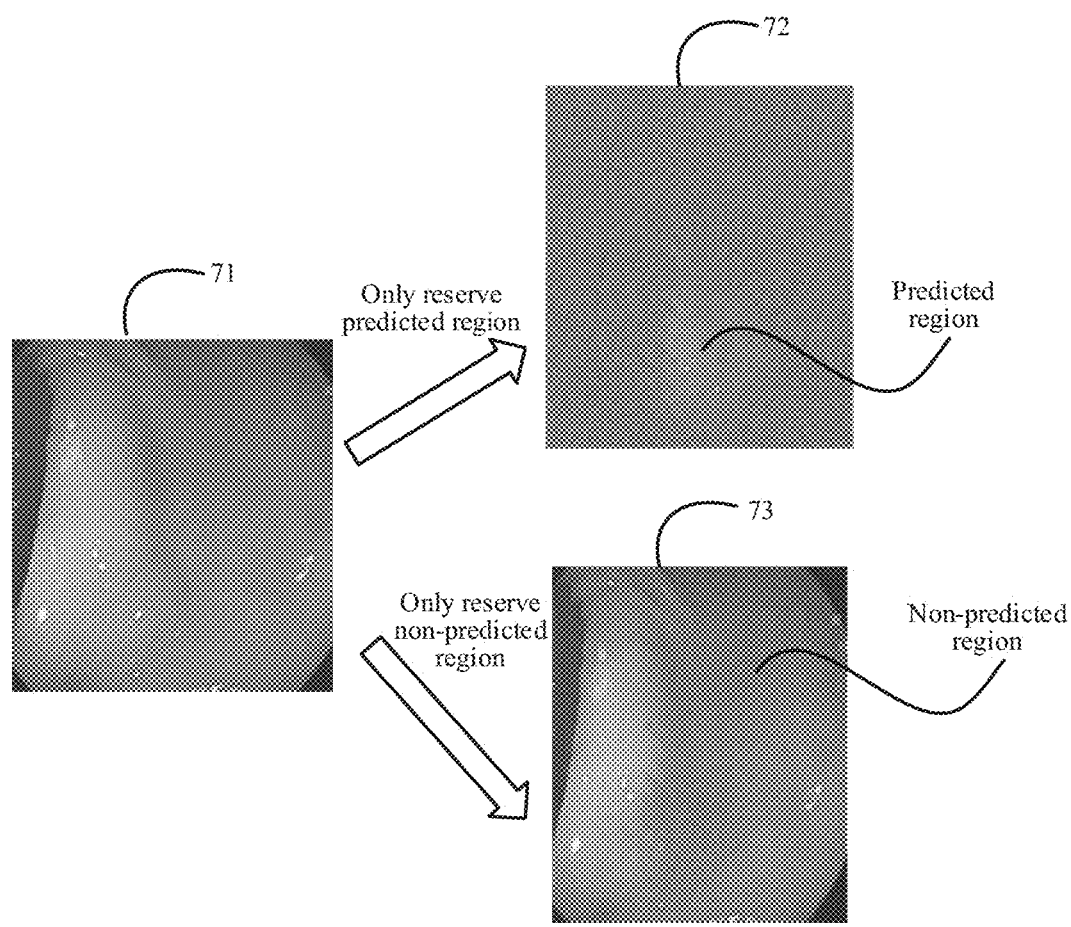
FIG. 7a is a schematic diagram of a second sample image and an optimization image according to an embodiment of this application.

FIG. 7a is a schematic diagram of a second sample image, a first optimization image, and a second optimization image according to an embodiment of this application. 71 represents a second sample image, and 72 represents a first optimization image obtained after pointwise multiplication and other operations are performed on a predicted region included in the second positioning image and the second sample image. The predicted region may be reserved in the first optimization image. 73 represents a second optimization image obtained after a region corresponding to the predicted region is removed from the second sample image. It may be seen that in the second optimization image, only the predicted region is removed, and a non-predicted region is reserved.

In an embodiment, an area of the predicted region in the second positioning image may be calculated by using the following formula (2):

$$\mathcal{L}_A(m) = \frac{1}{I \times J} \sum_i \sum_j m(i, j) \quad (2)$$

In formula (2), I×J represents a total quantity of pixels included in the second positioning image, and m(i,j) represents pixel location coordinates.

In formula (1), $\mathcal{L}_{TV}(m)$ represents a smoothing function configured for performing smoothing on the predicted region in the second positioning image, $\lambda_4$ represents a weight value of the smoothing function, and a value of the smoothing function may be calculated by using the following formula (3):

$$\mathcal{L}_{TV}(m) = \Sigma_{i,j}(m_{i,j} - m_{i,j+1})^2 + \Sigma_{i,j}(m_{i,j} - m_{i+1,j})^2 \quad (3)$$

Figure 7B:
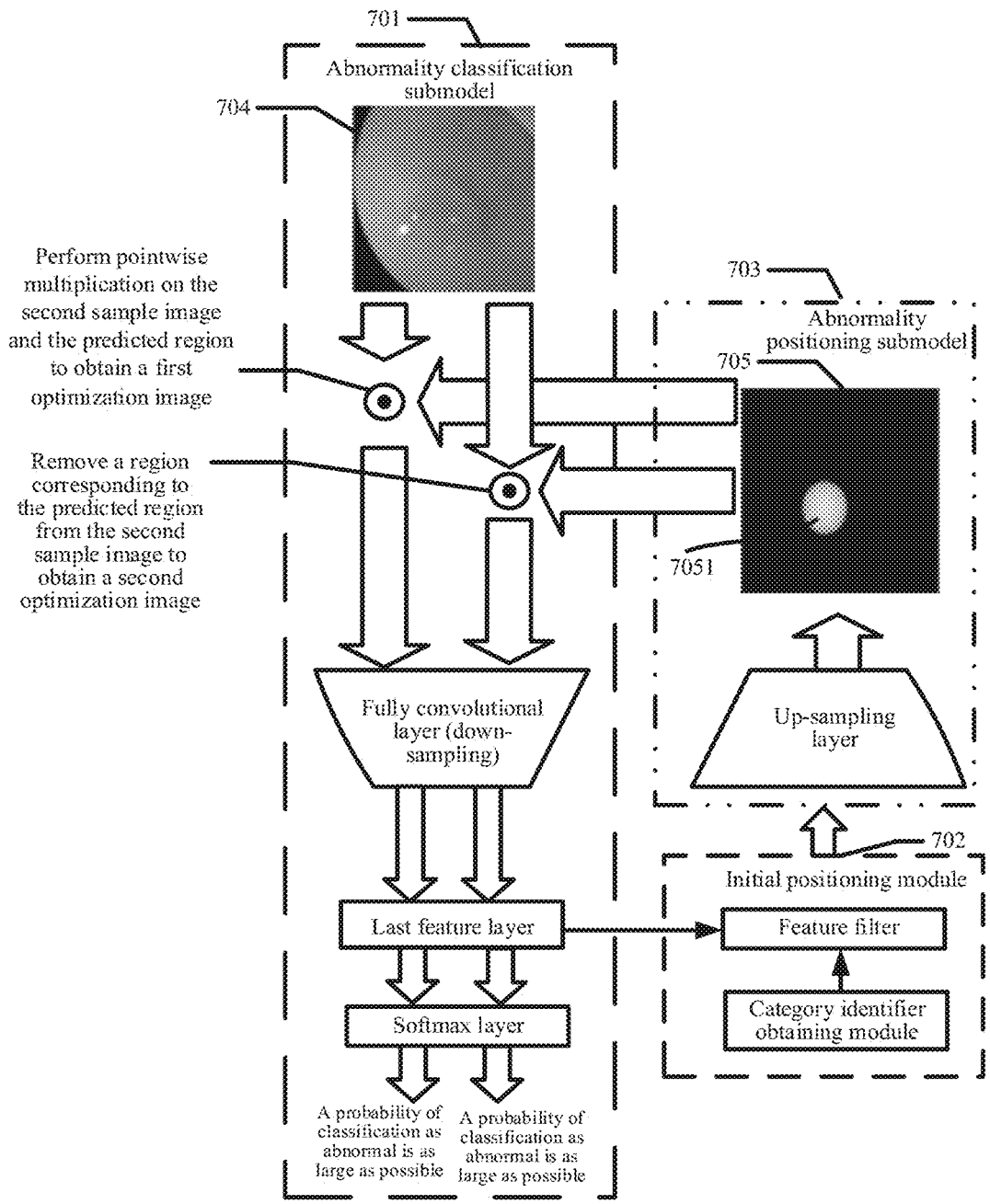
FIG. 7b is a schematic diagram of determining a first probability and a second probability according to an embodiment of this application.

Based on the foregoing description and formula (1) to formula (3), an embodiment of this application provides a schematic structural diagram of training an abnormality positioning submodel. FIG. 7b shows a process of determining a first probability and a second probability. In FIG. 7b, 701 represents an abnormality classification submodel, 702 represents an initial positioning module, and 703 represents an abnormality positioning submodel. 704 represents a second sample image, and 705 represents a target positioning image obtained after the second sample image is processed by using the abnormality classification submodel 701, the initial positioning module 702, and the abnormality positioning submodel 703. In 705, 7051 represents a predicted region. Pointwise multiplication is performed on pixels in the predicted region 7051 and pixels in the second sample image 704 to obtain a first optimization image, and the abnormality classification submodel is invoked to perform down-sampling abnormality classification processing on the first optimization image, to obtain a first probability. During optimization of the abnormality positioning submodel, the first probability is ensured to be as large as possible. A region corresponding to the predicted abnormal region is removed from the second sample image, to obtain a second optimization image, and the abnormality classification submodel is invoked to perform down-sampling abnormality classification processing on the second optimization image, to obtain a second probability. During optimization of the abnormality positioning submodel, the second probability is ensured to be as large as possible.

Step S603. Obtain a to-be-detected image, and invoke the abnormality classification submodel in the image detection model to perform down-sampling abnormality classification processing on the to-be-detected image, to obtain a predicted abnormality category label and a target feature image.

Step S604. Invoke, when the predicted abnormality category label indicates that there is an abnormality in the to-be-detected image, the initial positioning module in the image detection model to perform preliminary abnormality positioning processing based on the predicted abnormality category label and the target feature image, to obtain an initial positioning image corresponding to the to-be-detected image.

To reduce overheads of power consumption of the server, after step S603, it may be first detected whether the predicted abnormality category label indicates that there is an abnormality in the to-be-detected image. In a case that the predicted abnormality category label indicates that there is an abnormality in the to-be-detected image, step S604 is performed; and when the predicted abnormality category label indicates that there is no abnormality in the to-be-detected image, step S604 may be performed, and the predicted abnormality category label may be directly outputted.

Step S605. Invoke the abnormality positioning submodel in the image detection model to perform up-sampling abnormality positioning processing on the initial positioning image, to obtain a target positioning image corresponding to the to-be-detected image.

Step S606. Output the predicted abnormality category label and the target positioning image.

In an embodiment, the target positioning image may be a mask image, a predicted region may be displayed in the mask image, and other non-predicted regions are covered by a selected mask. A user may clearly and accurately determine, by using the mask image, a target region having an abnormality in the to-be-detected image.

In the foregoing process of image processing, when the predicted abnormality category label indicates that the to-be-detected image includes a target abnormal region, subsequent processing is performed to obtain a target positioning image, which can reduce terminal power consumption of the server. In addition, the abnormality classification submodel may be invoked to perform down-sampling abnormality classification processing on the to-be-detected image, to obtain the predicted abnormality category label, which saves manpower and is more efficient when compared with the method of obtaining an abnormality category through human analysis in the prior art. Further, in the embodiments of this application, preliminary abnormality positioning processing is performed based on the predicted abnormality category label and a target feature image obtained in the process of down-sampling abnormality classification processing. Next, up-sampling abnormality positioning processing is performed on an initial positioning image obtained through preliminary abnormality positioning processing, to obtain a target positioning image of the target abnormal region in the to-be-detected image. It may be ensured that the obtained target positioning image is more accurate by performing positioning processing twice.

Figure 8A:
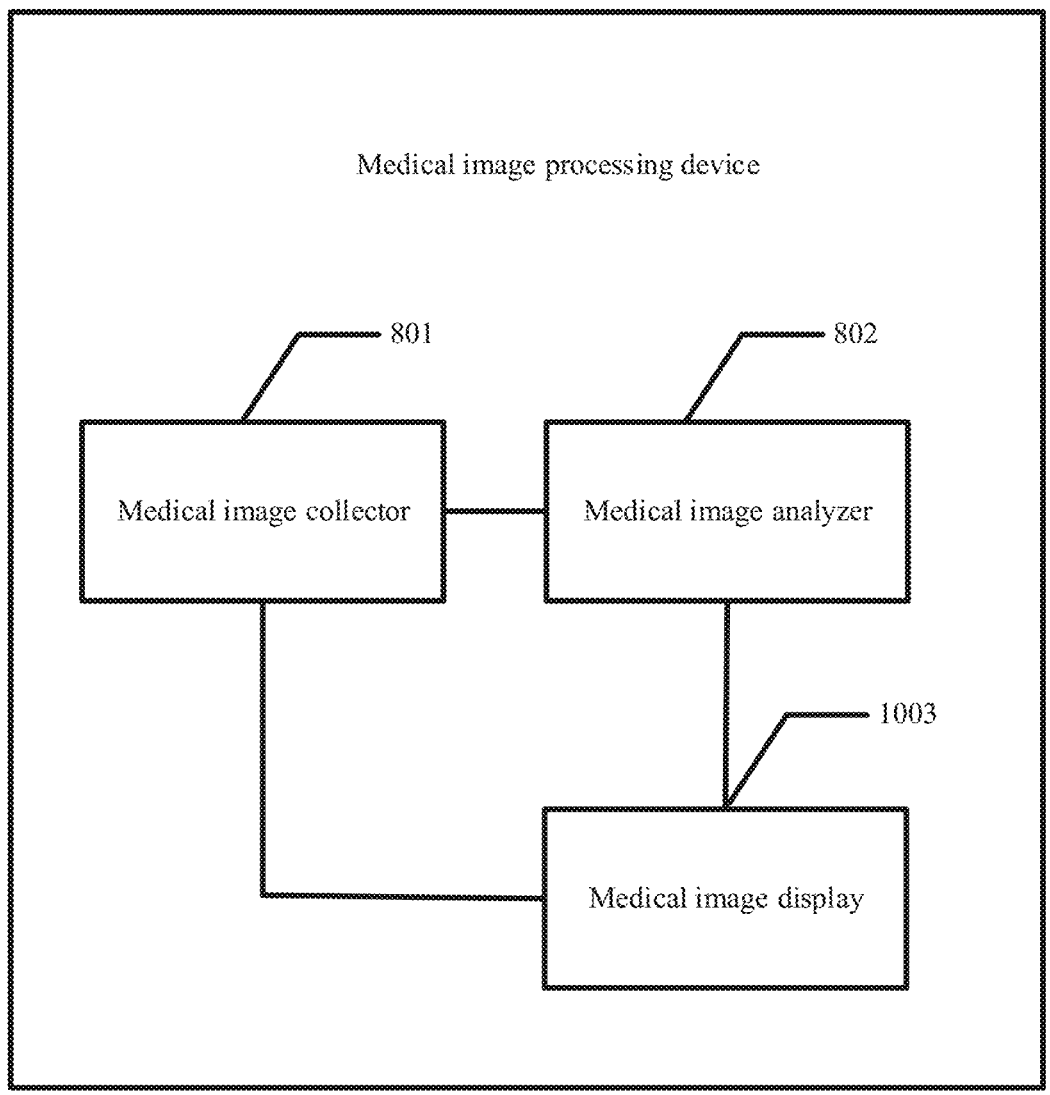
FIG. 8a is a schematic structural diagram of a medical image processing device according to an embodiment of this application.

Based on the foregoing description, an embodiment of this application further provides a medical image processing device. FIG. 8a is a schematic structural diagram of a medical image processing device according to an embodiment of this application. The medical image processing device may include a medical image collector 801, a medical image analyzer 802, and a medical image display 803.

The medical image analyzer 802 corresponds to the server in the foregoing embodiments, for example, the server 103 shown in FIG. 1a. The medical image collector 801 corresponds to the terminal in the foregoing embodiments, for example, the image acquisition terminal 120 shown in FIG. 1a. The medical image display 803 may be a terminal, or may be a display device connected to a terminal, for example, the image displaying device 140 shown in FIG. 1a. The medical image collector 801 is connected to the medical image analyzer 802, and the medical image analyzer 802 is connected to the medical image display 803.

Figure 8B:
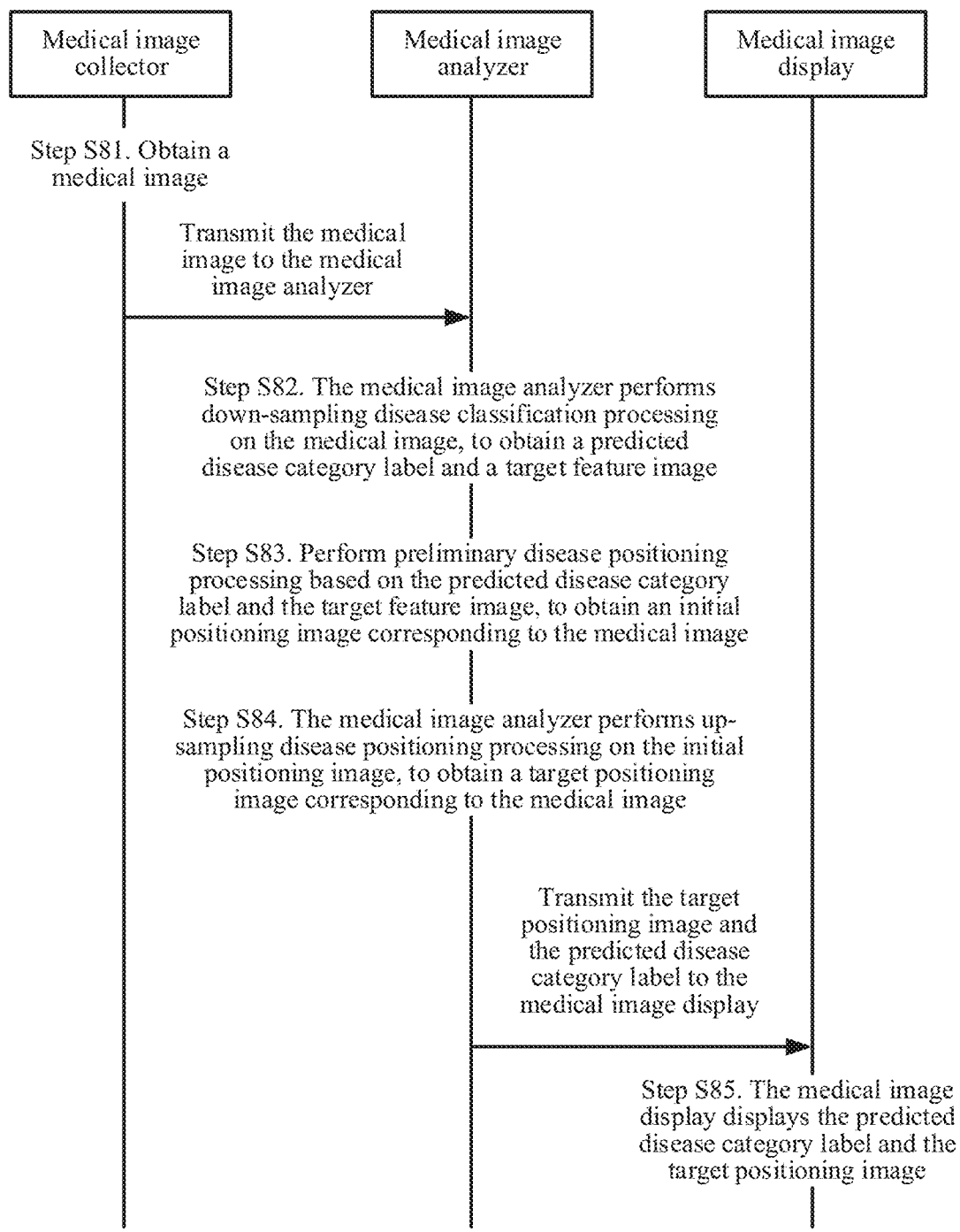
FIG. 8b is a schematic diagram of image processing performed by a medical image processing device according to an embodiment of this application.

The medical image processing device shown in FIG. 8a may acquire a medical image and analyze the medical image. During specific implementation, interaction among the medical image collector 801, the medical image analyzer 802, and the medical image display 803 in FIG. 8a may be shown in FIG. 8b. Referring to FIG. 8b, a process in which the medical image processing device shown in FIG. 8a acquires a medical image and analyzes the medical image is specifically described below. During specific implementation, the process may include the following steps:

Step S81. The medical image collector obtains a medical image.

The medical image herein is equivalent to the to-be-detected image in the embodiments of FIG. 2 and FIG. 6, and the medical image collector may be a medical device that can perform examination on human body, for example, an endoscope device or a CT device.

Step S82. The medical image analyzer performs down-sampling disease classification processing on the medical image, to obtain a predicted disease category label and a target feature image.

In an embodiment, the predicted disease category label is equivalent to the predicted abnormality category label in the embodiments of FIG. 2 and FIG. 6. In some embodiments, for some implementations included in step S82, reference may be made to the related description of performing down-sampling abnormality classification processing on the to-be-detected image to obtain a predicted abnormality category label and a target feature image in the embodiments of FIG. 2 and FIG. 6.

Step S83. Perform preliminary disease positioning processing based on the predicted disease category label and the target feature image, to obtain an initial positioning image corresponding to the medical image.

In an embodiment, the predicted disease category label is configured for indicating whether there is a disease in the medical image, and if there is a disease, which type of disease exists. If the predicted disease category label indicates that there is no disease in the medical image, that is, there is no target lesion region in the medical image, it indicates that lesion positioning does not need to be further performed on the medical image, and the medical image analyzer 802 may directly output the predicted disease category label to the medical image display 803. If the predicted disease category label indicates that there is a disease in the medical image, that is, there is a target lesion region in the medical image, lesion positioning may be further performed, and the medical image analyzer 802 performs preliminary disease positioning processing based on the predicted disease category label and the target feature image, to obtain an initial positioning image corresponding to the medical image.

In some embodiments, in a case of performing preliminary disease positioning processing based on the predicted disease category label and the target feature image, to obtain the initial positioning image, the medical image analyzer performs 802 the following operations: obtaining a target category identifier corresponding to the predicted disease category label; and invoking an initial positioning module, obtaining a target feature weight vector corresponding to the target category identifier, and superimposing the target feature weight vector and the target feature image, to obtain the initial positioning image.

For specific implementations, reference may be made to the description of performing preliminary abnormality positioning processing based on the predicted abnormality category label and the target feature image, to obtain an initial positioning image corresponding to the to-be-detected image in the embodiments of FIG. 2 and FIG. 6. Details are not described herein again.

Step S84. The medical image analyzer performs up-sampling disease positioning processing on the initial positioning image, to obtain a target positioning image corresponding to the medical image.

In an embodiment, the medical image analyzer 802 invokes a disease classification submodel (equivalent to the foregoing abnormality classification submodel) to perform down-sampling disease classification processing on the medical image, and the medical image analyzer invokes a disease positioning submodel to perform up-sampling disease positioning processing on the initial positioning image. The disease classification submodel includes at least one first sampling module, the disease positioning submodel includes at least one second sampling module, and a quantity of first sampling modules being greater than a quantity of second sampling modules.

In a case of performing down-sampling disease classification processing on the medical image, the medical image analyzer performs the following operations: obtaining a disease classification submodel, the disease classification submodel including at least one first sampling module; invoking the at least one first sampling module to process the medical image, to extract a feature included in the medical image; performing abnormality detection based on the extracted feature, to obtain the predicted disease category label; and determining a feature image outputted by the last sampling module in the at least one first sampling module as the target feature image.

In a case of performing up-sampling disease positioning processing on the initial positioning image, the medical image analyzer performs the following operations: obtaining a disease positioning submodel, the disease positioning submodel including at least one second sampling module, a quantity of first sampling modules being greater than a quantity of second sampling modules; and invoking the at least one second sampling module, to perform up-sampling disease positioning processing on the initial positioning image.

For specific implementations, reference may be made to the description of performing up-sampling abnormality positioning processing on the initial positioning image to obtain a target positioning image corresponding to the to-be-detected image in the embodiments of FIG. 2 and FIG. 6. Details are not described herein again.

Step S85. The medical image display is configured to display the predicted disease category label and the target positioning image.

In an embodiment, after obtaining the target positioning image, the medical image analyzer 802 may output the target positioning image and the predicted disease category label to the medical image display 803, and the medical image display 803 displays the predicted disease category label and the target positioning image in a user interface.

In some embodiments, the medical image display 803 may be alternatively connected to the medical image collector 801. After acquiring a medical image, and before transmitting the medical image to the medical image analyzer 802, the medical image collector 801 may transmit the medical image to the medical image display 803, and the medical image display 803 displays the medical image in the user interface.

In an embodiment, the medical image display 803 may further display, in the user interface, prompt information about whether to submit the medical image to the medical image analyzer 802, so that the medical image analyzer 802 performs disease recognition and positioning processing on the medical image. After the medical image display 803 detects a submission confirmation operation specific to the prompt information, the medical image display 803 transmits the medical image to the medical image analyzer 802. After the medical image display 803 detects a submission cancellation operation specific to the prompt information, the medical image display 803 may not transmit the medical image to the medical image analyzer 802.

For example, assuming that after acquiring the medical image, the medical image collector 801 transmits the medical image to the medical image display 803, the medical image display 803 displays, in the user interface, the medical image and prompt information about whether to submit the medical image to the medical image analyzer 802.

Figure 8C:
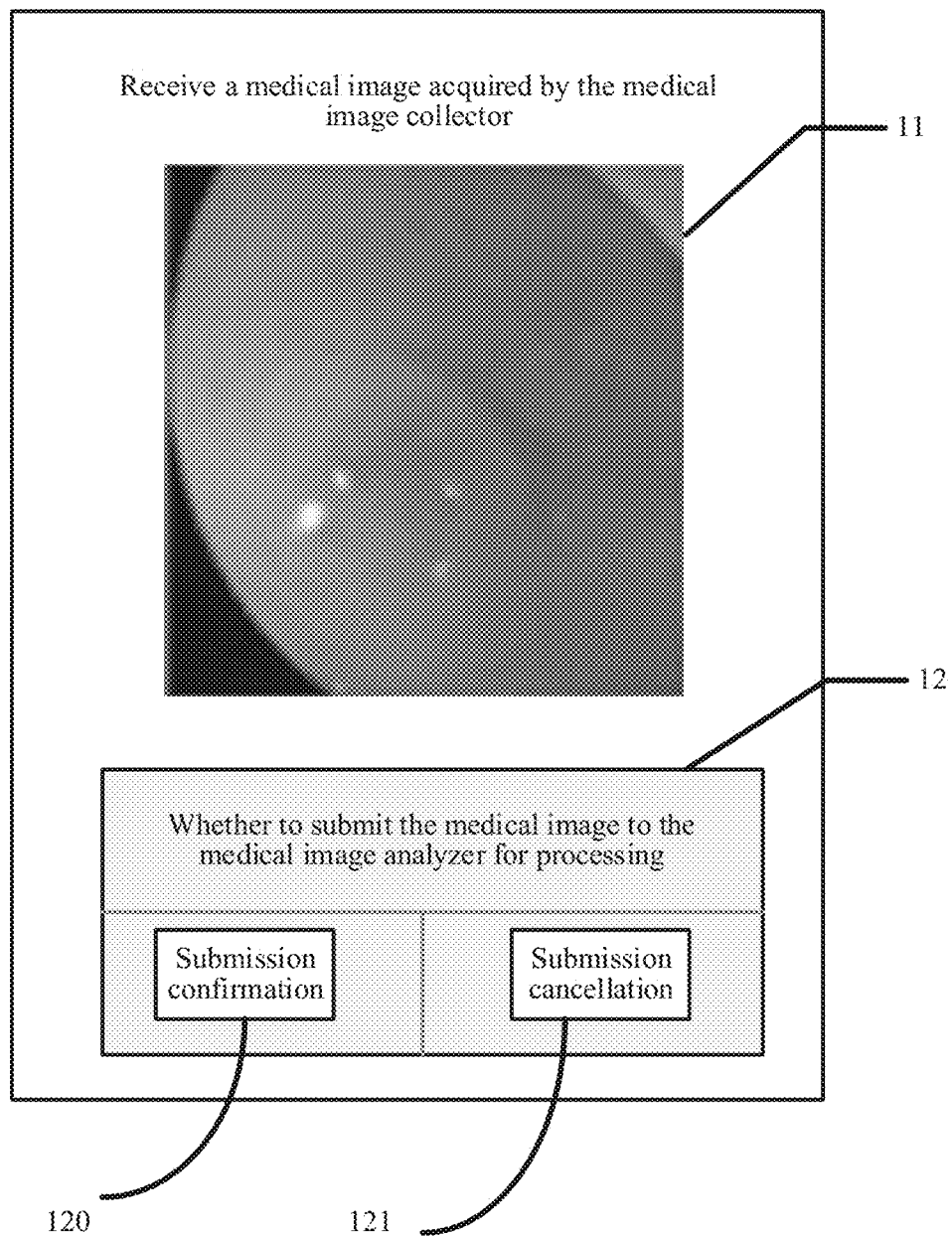
FIG. 8c is a schematic diagram of a user interface of a medical image display according to an embodiment of this application.
Figure 11:
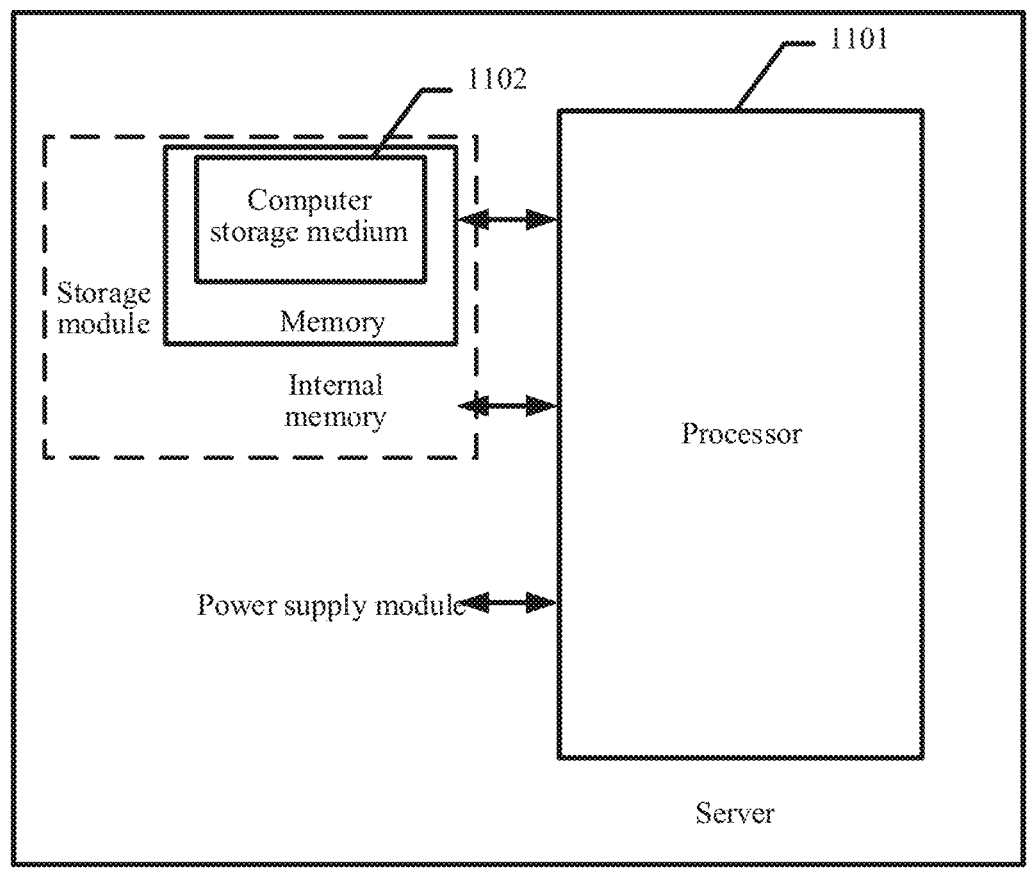
FIG. 11 is a schematic structural diagram of a server according to an embodiment of this application.

FIG. 8c is a schematic diagram of a user interface of a medical image display according to an embodiment of this application. In FIG. 8c, 11 represents a medical image acquired by the medical image collector 801, and 12 represents prompt information. The prompt information may include a submission confirmation button 120 and a submission cancellation button 121. When a user clicks the submission confirmation button 120, the medical image display 803 submits the medical image to the medical image analyzer 802 for analyzing. When a user clicks the submission cancellation button 121, the medical image display 803 does not submit the medical image to the medical image analyzer 802.

In the foregoing image detection process, down-sampling disease classification processing may be performed on a medical image, to obtain a predicted disease category label, which saves manpower and is more efficient when compared with the method of obtaining a disease category through human analysis in the prior art. Further, in the embodiments of this application, preliminary disease positioning processing is performed based on the predicted disease category label and a target feature image obtained in the process of down-sampling processing. Next, up-sampling disease positioning processing is performed on an initial positioning image obtained through preliminary disease positioning processing, to obtain a target positioning image corresponding to the medical image. It may be ensured that the obtained target positioning image is more accurate by performing positioning processing twice.

Figure 9A:
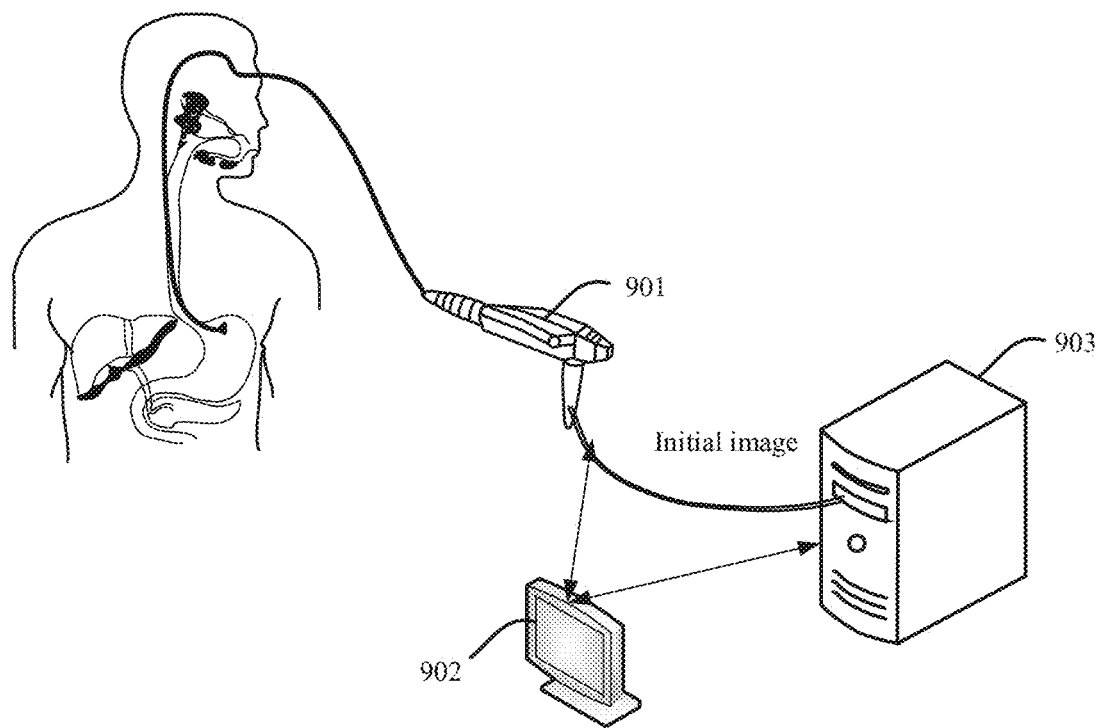
FIG. 9a is a diagram of an application scenario of medical image processing according to an embodiment of this application.
Figure 9B:
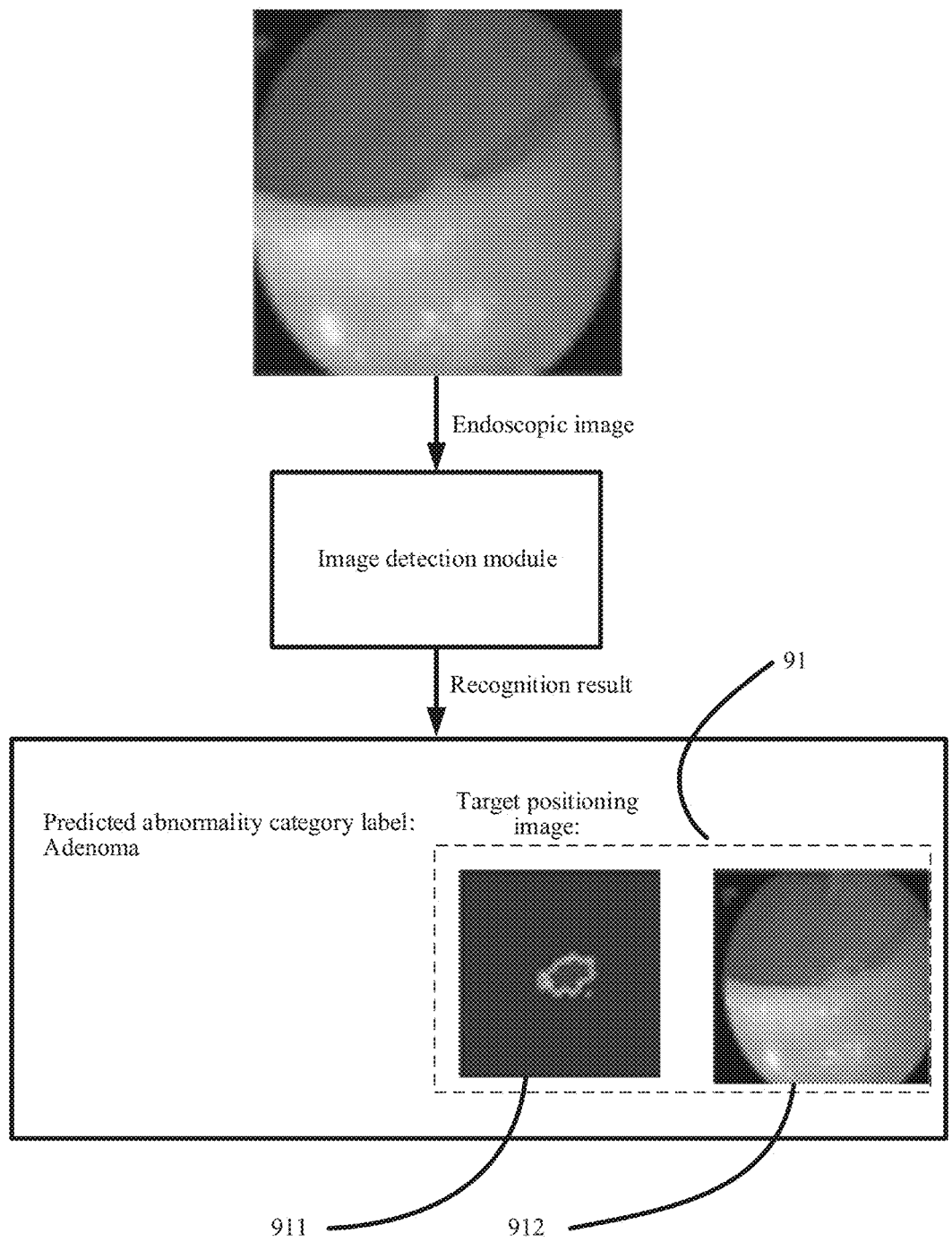
FIG. 9b is a schematic diagram of processing a medical image according to an embodiment of this application.

Based on the description in the foregoing embodiments, an application scenario of medical image processing is specifically described by using an example of application in a medical field with reference to FIG. 9a and FIG. 9b. FIG. 9a is a diagram of an application scenario of medical image processing according to an embodiment of this application. The application scenario includes a medical image collector, for example, an endoscope 901, a medical image display 902, and a medical image analyzer 903. It is assumed that a doctor uses the endoscope 901 to inspect a human digestive tract, to obtain medical video data. The endoscope 901 may transmit the medical video data to the medical image display 902, and the medical image display 902 divides the medical video data by using a script, to obtain a plurality of frames of medical images.

After an operation of submitting the medical image to the medical image analyzer 903 is detected, the medical image display 902 sequentially transmits the plurality of frames of images to the medical image analyzer 903. FIG. 9b is a schematic diagram of the medical image analyzer 903 processing a medical image according to an embodiment of this application. As shown in 91 of FIG. 9b, the medical image analyzer 903 invokes an image detection model to perform disease category recognition and lesion region positioning processing on the medical image, to obtain a predicted disease category label and a target positioning image of the lesion region. In some embodiments, the target positioning image may include a mask positioning image 911 and a non-mask positioning image 912. Further, the medical image analyzer 903 transmits the predicted disease category label and the target positioning image of the lesion region to the medical image display 902, and the medical image display 902 displays the predicted disease category label and the target positioning image in a user interface. The doctor may perform disease diagnosis according to the content displayed on the medical image display 902.

Figure 10:
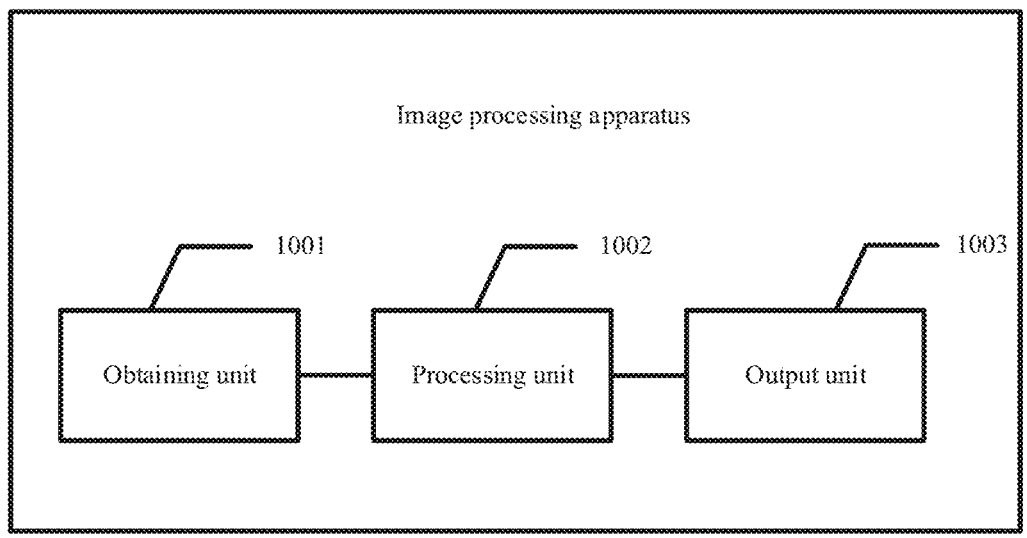
FIG. 10 is a schematic structural diagram of an image processing apparatus according to an embodiment of this application.

Based on the foregoing image processing method, an embodiment of this application further provides an image processing apparatus. FIG. 10 is a schematic structural diagram of an image processing apparatus according to an embodiment of this application. The image processing apparatus may operate the following units:

an obtaining unit 1001, configured to obtain a to-be-detected image;

a processing unit 1002, configured to perform down-sampling abnormality classification processing on the to-be-detected image, to obtain a predicted abnormality category label and a target feature image; perform preliminary abnormality positioning processing based on the predicted abnormality category label and the target feature image, to obtain an initial positioning image corresponding to the to-be-detected image; and perform up-sampling abnormality positioning processing on the initial positioning image, to obtain a target positioning image corresponding to the to-be-detected image; and an output unit 1003, configured to output the predicted abnormality category label and the target positioning image, the initial positioning image and the target positioning image being configured for reflecting attribute information of a target region associated with the predicted abnormality category label.

In an embodiment, the processing unit 1002 is configured to obtain a target category identifier corresponding to the predicted abnormality category label; and invoke an initial positioning module, obtain a target feature weight vector corresponding to the target category identifier, and superimpose the target feature weight vector and the target feature image, to obtain the initial positioning image.

In an embodiment, the processing unit 1002 is configured to obtain an abnormality classification submodel, the abnormality classification submodel including at least one first sampling module; and invoke the at least one first sampling module to process the to-be-detected image, to extract a feature included in the to-be-detected image; perform abnormality detection based on the extracted feature, to obtain the predicted abnormality category label; and determine a feature image outputted by the last sampling module in the at least one first sampling module as the target feature image.

In an embodiment, the processing unit 1002 is configured to obtain an abnormality positioning submodel, the abnormality positioning submodel including at least one second sampling module, a quantity of first sampling modules being greater than a quantity of second sampling modules; and invoke the at least one second sampling module, to perform up-sampling abnormality positioning processing on the initial positioning image.

In an embodiment, the processing unit 1002 is further configured to obtain a second sample image; invoke the abnormality classification submodel to perform down-sampling abnormality classification processing on the second sample image, to obtain an abnormality category training label; invoke the initial positioning module to perform preliminary abnormality positioning processing on the abnormality category training label, to obtain a first positioning image; and train the abnormality positioning submodel based on the abnormality category training label and the first positioning image.

In an embodiment, the processing unit 1002 is further configured to perform down-sampling abnormality classification processing on the second sample image, to obtain a training feature image; obtain a first category identifier corresponding to the abnormality category training label; and invoke the initial positioning module to perform preliminary abnormality positioning processing based on the first category identifier and the training feature image, to obtain the first positioning image.

According to an embodiment of this application, the units of the image processing apparatus shown in FIG. 10 may be separately or wholly combined into one or several other units, or one (or more) of the units herein may be further divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the image processing apparatus may also include other units. In an actual application, the functions may also be cooperatively implemented by other units and may be cooperatively implemented by a plurality of units. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

According to an embodiment of this application, a computer program (including program code) that can perform the steps in the corresponding method shown in FIG. 2 and FIG. 6 may be run on a general computing device, such as a computer, which includes processing elements and storage elements such as a central processing unit (CPU), a random access memory (RAM), and a read-only memory (ROM), to construct the image processing apparatus shown in FIG. 10 and implement the image processing method in the embodiments of this application. The computer program may be recorded on, for example, a computer-readable recording medium, and may be loaded into the foregoing computing device by using the computer-readable recording medium and run on the computing device.

Based on the foregoing method embodiments and apparatus embodiments, an embodiment of this application further provides a server. FIG. 11 is a schematic structural diagram of a server according to an embodiment of this application. The server shown in FIG. 11 may include a processor 1101 and a computer storage medium 1102.

The computer storage medium 1102 may be stored in a memory of a terminal, and is configured to store a computer program, and the computer program includes program instructions. The processor 1101 is configured to execute the program instructions stored in the computer storage medium 1102. The processor 1101 (or referred to as a CPU) is a computing core and control core of the terminal, which is adapted to implement one or more instructions, and specifically, adapted to load and execute one or more instructions to implement corresponding method processes or corresponding functions. In an embodiment, the processor 1101 may be further configured to perform the image processing method in the foregoing embodiments.

An embodiment of this application further provides a computer storage medium (a memory), and the computer storage medium is a memory device in an electronic device and is configured to store programs and data. It may be understood that the computer storage medium herein may include an internal storage medium of the electronic device and certainly may also include an extended storage medium supported by the electronic device. The computer storage medium provides a storage space, and the storage space further stores one or more instructions adapted to be loaded and executed by the processor 1101. The instructions may be one or more computer programs (including program code). The computer storage medium herein may be a high-speed RAM, or may be a non-volatile memory, such as at least one magnetic disk storage. In some embodiments, the computer storage medium may be at least one computer storage medium far away from the foregoing processor.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The storage medium may be a magnetic disk, an optical disc, a ROM, a RAM, or the like.

The foregoing disclosure is merely some embodiments of this application, and certainly is not intended to limit the protection scope of this application. Therefore, equivalent variations made in accordance with the claims of this application shall fall within the scope of this application.

What is claimed is:

1. An image processing method performed by a computer device, the method comprising:
    obtaining a to-be-detected image, and performing down-sampling abnormality classification processing on the to-be-detected image, to obtain a predicted abnormality category label and a target feature image;
    performing preliminary abnormality positioning processing based on the predicted abnormality category label and the target feature image, to obtain an initial positioning image corresponding to the to-be-detected image, further including:
        obtaining a target category identifier corresponding to the predicted abnormality category label;

performing global average pooling on the target feature image to obtain a plurality of feature weight vectors, each feature weight vector corresponding to a respective channel of the target feature image after the global average pooling;

obtaining, among the plurality of feature weight vectors, a target feature weight vector corresponding to the target category identifier; and superimposing the target feature weight vector and the target feature image, to obtain a heat map as the initial positioning image;

performing up-sampling abnormality positioning processing on the initial positioning image, to obtain a target positioning image corresponding to the to-be-detected image; and outputting the predicted abnormality category label and the target positioning image, the initial positioning image and the target positioning image being configured for reflecting attribute information of a target region associated with the predicted abnormality category label within the to-be-detected image.

2. The method according to claim 1, wherein:
the performing down-sampling abnormality classification processing on the to-be-detected image, to obtain a predicted abnormality category label and a target feature image, further comprises:

invoking an abnormality classification submodel to process the to-be-detected image, to extract a feature comprised in the to-be-detected image;

performing abnormality detection based on the extracted feature, to obtain the predicted abnormality category label; and determining a feature image outputted by the last sampling module in the at least one first sampling module as the target feature image.

3. The method according to claim 2, wherein:
the performing up-sampling abnormality positioning processing on the initial positioning image, to obtain a target positioning image corresponding to the to-be-detected image, comprising:

invoking an abnormality positioning submodel, to perform the up-sampling abnormality positioning processing on the initial positioning image.

4. The method according to claim 3, further comprising:
obtaining a second sample image;
invoking the abnormality classification submodel to perform down-sampling abnormality classification processing on the second sample image, to obtain an abnormality category training label;

invoking the initial positioning module to perform preliminary abnormality positioning processing on the abnormality category training label, to obtain a first positioning image; and obtaining the abnormality positioning submodel through training based on the abnormality category training label and the first positioning image.

5. The method according to claim 4, further comprising:
performing down-sampling abnormality classification processing on the second sample image, to obtain a training feature image; and the invoking the initial positioning module to perform preliminary abnormality positioning processing on the abnormality category training label, to obtain a first positioning image, comprising:

obtaining a first category identifier corresponding to the abnormality category training label; and invoking the initial positioning module to perform the preliminary abnormality positioning processing based on the first category identifier and the training feature image, to obtain the first positioning image.

6. The method according to claim 4, further comprising:
invoking the abnormality positioning submodel to perform up-sampling abnormality positioning processing on the first positioning image, to obtain a second positioning image corresponding to the second sample image; and obtaining a value of a target loss function corresponding to the abnormality positioning submodel based on the second positioning image and the second sample image, and optimizing the abnormality positioning submodel in a direction of reducing the value of the target loss function, the first positioning image and the second positioning image being configured for reflecting attribute information of a predicted abnormal region associated with the abnormality category training label.

7. The method according to claim 6, wherein the obtaining a value of a target loss function corresponding to the abnormality positioning submodel based on the second positioning image and the second sample image comprises:

obtaining a first optimization image and a second optimization image based on the attribute information of the predicted abnormal region comprised in the second positioning image and the second sample image, and invoking the abnormality classification submodel to perform abnormality classification processing respectively on the first optimization image and the second optimization image, to obtain a first probability and a second probability;

obtaining an area of the predicted abnormal region in second positioning image;

obtaining a value of a smoothing function configured for performing optimization smoothing on the predicted abnormal region; and determining the value of the target loss function corresponding to the abnormality positioning submodel according to the first probability, the second probability, the area of the predicted abnormal region, and the value of the smoothing function.

8. The method according to claim 2, further comprising:
obtaining the abnormality classification submodel through training based on first sample images and abnormality category supervisory labels corresponding to the first sample images.

9. A computer device, comprising:
a processor; and
a memory storing one or more instructions, the one or more instructions being executed by the processor to perform a plurality of operations including:

obtaining a to-be-detected image, and performing down-sampling abnormality classification processing on the to-be-detected image, to obtain a predicted abnormality category label and a target feature image;

performing preliminary abnormality positioning processing based on the predicted abnormality category label and the target feature image, to obtain an initial positioning image corresponding to the to-be-detected image, further including:

obtaining a target category identifier corresponding to the predicted abnormality category label;

performing global average pooling on the target feature image to obtain a plurality of feather weight vectors, each feature weight vector corresponding to a respective channel of the target feature image after the global average pooling;

obtaining, among the plurality of weight vectors, a target feature weight vector corresponding to the target category identifier; and superimposing the target feature weight vector and the target feature image, to obtain a heat map as the initial positioning image;

performing up-sampling abnormality positioning processing on the initial positioning image, to obtain a target positioning image corresponding to the to-be-detected image; and outputting the predicted abnormality category label and the target positioning image, the initial positioning image and the target positioning image being configured for reflecting attribute information of a target region associated with the predicted abnormality category label within the to-be-detected image.

10. The computer device according to claim 9, wherein:
the performing down-sampling abnormality classification processing on the to-be-detected image, to obtain a predicted abnormality category label and a target feature image, further comprise:

invoking an abnormality classification submodel to process the to-be-detected image, to extract a feature comprised in the to-be-detected image;

performing abnormality detection based on the extracted feature, to obtain the predicted abnormality category label; and determining a feature image outputted by the last sampling module in the at least one first sampling module as the target feature image.

11. The computer device according to claim 10, wherein:
the performing up-sampling abnormality positioning processing on the initial positioning image, to obtain a target positioning image corresponding to the to-be-detected image, comprising:

invoking an abnormality positioning submodel, to perform the up-sampling abnormality positioning processing on the initial positioning image.

12. The computer device according to claim 11, wherein the plurality of operations further comprise:

obtaining a second sample image;

invoking the abnormality classification submodel to perform down-sampling abnormality classification processing on the second sample image, to obtain an abnormality category training label;

invoking the initial positioning module to perform preliminary abnormality positioning processing on the abnormality category training label, to obtain a first positioning image; and obtaining the abnormality positioning submodel through training based on the abnormality category training label and the first positioning image.

13. The computer device according to claim 10, wherein the plurality of operations further comprise:

obtaining the abnormality classification submodel through training based on first sample images and abnormality category supervisory labels corresponding to the first sample images.

14. A non-transitory computer storage medium, storing computer program instructions, the computer program instructions, when executed by a processor of a computer device, causing the computer device to perform a plurality of operations including:

obtaining a to-be-detected image, and performing down-sampling abnormality classification processing on the to-be-detected image, to obtain a predicted abnormality category label and a target feature image;

performing preliminary abnormality positioning processing based on the predicted abnormality category label and the target feature image, to obtain an initial positioning image corresponding to the to-be-detected image, further including:

obtaining a target category identifier corresponding to the predicted abnormality category label;

performing global average pooling on the target feature image to obtain a plurality of feather weight vectors, each feature weight vector corresponding to a respective channel of the target feature image after the global average pooling;

obtaining, among the plurality of weight vectors, a target feature weight vector corresponding to the target category identifier; and superimposing the target feature weight vector and the target feature image, to obtain a heat map as the initial positioning image;

performing up-sampling abnormality positioning processing on the initial positioning image, to obtain a target positioning image corresponding to the to-be-detected image; and outputting the predicted abnormality category label and the target positioning image, the initial positioning image and the target positioning image being configured for reflecting attribute information of a target region associated with the predicted abnormality category label within the to-be-detected image.

15. The non-transitory computer storage medium according to claim 14, wherein:
the performing down-sampling abnormality classification processing on the to-be-detected image, to obtain a predicted abnormality category label and a target feature image, further comprises:

invoking an abnormality classification submodel to process the to-be-detected image, to extract a feature comprised in the to-be-detected image;

performing abnormality detection based on the extracted feature, to obtain the predicted abnormality category label; and determining a feature image outputted by the last sampling module in the at least one first sampling module as the target feature image.

16. The non-transitory computer storage medium according to claim 15, wherein:
the performing up-sampling abnormality positioning processing on the initial positioning image, to obtain a target positioning image corresponding to the to-be-detected image, comprising:

invoking an abnormality positioning submodel, to perform the up-sampling abnormality positioning processing on the initial positioning image.

17. The non-transitory computer storage medium according to claim 15, wherein the plurality of operations further comprise:

obtaining the abnormality classification submodel through training based on first sample images and abnormality category supervisory labels corresponding to the first sample images.

* * * * *